(12) United States Patent
Zych

(10) Patent No.: US 10,209,716 B1
(45) Date of Patent: Feb. 19, 2019

(54) SYSTEMS AND METHODS FOR COMMUNICATING AUTONOMOUS VEHICLE SCENARIO EVALUATION AND INTENDED VEHICLE ACTIONS

(71) Applicant: Uber Technologies, Inc., San Francisco, CA (US)

(72) Inventor: Noah Zych, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/678,675

(22) Filed: Aug. 16, 2017

(51) Int. Cl.
| | | |
|---|---|---|
| *B60W 30/09* | (2012.01) | |
| *G05D 1/02* | (2006.01) | |
| *B60Q 5/00* | (2006.01) | |
| *B60K 28/02* | (2006.01) | |
| *G05D 1/00* | (2006.01) | |
| *G08G 1/16* | (2006.01) | |
| *B60W 30/095* | (2012.01) | |
| *B60W 30/08* | (2012.01) | |
| *B60W 50/14* | (2012.01) | |

(52) U.S. Cl.
CPC .......... *G05D 1/0214* (2013.01); *B60K 28/02* (2013.01); *B60Q 5/006* (2013.01); *B60W 30/08* (2013.01); *B60W 30/09* (2013.01); *B60W 30/095* (2013.01); *B60W 30/0953* (2013.01); *B60W 30/0956* (2013.01); *B60W 50/14* (2013.01); *G05D 1/0055* (2013.01); *G08G 1/166* (2013.01)

(58) Field of Classification Search
CPC ...... B60W 50/14; B60W 30/08; B60W 30/09; B60W 30/095; B60W 30/0953; B60W 30/0956; B60W 2050/143; B60W 2550/10

See application file for complete search history.

(56) References Cited

U.S. PATENT DOCUMENTS

| | | | | |
|---|---|---|---|---|
| 7,649,444 B1 * | 1/2010 | Fear | ................... | B60Q 5/00 |
| | | | | 340/384.1 |
| 2015/0178998 A1 * | 6/2015 | Attard | ................... | G07C 5/008 |
| | | | | 701/23 |
| 2015/0346718 A1 * | 12/2015 | Stenneth | ............ | G06Q 30/0611 |
| | | | | 701/2 |
| 2016/0232790 A1 * | 8/2016 | Massey | ................. | B60W 30/08 |
| 2017/0185088 A1 | 6/2017 | Sakai et al. | | |

(Continued)

OTHER PUBLICATIONS

PCT International Search Report and Written Opinion for PCT/US2018/000215, dated Dec. 10, 2018, 20 pages.

*Primary Examiner* — Andrew W Bee
(74) *Attorney, Agent, or Firm* — Dority & Manning, PA

(57) ABSTRACT

Systems and methods for communicating autonomous vehicle operations are provided. In one example embodiment, a computer implemented method includes obtaining data associated with the autonomous vehicle. The method includes identifying an object within the surrounding environment of the autonomous vehicle or a planned vehicle motion action of the autonomous vehicle based at least in part on the data associated with the autonomous vehicle. The method includes determining an audible vehicle indication that is associated with the identified object or the planned vehicle motion action. The audible vehicle indication is indicative of a type of the object or a type of the planned vehicle motion. The method includes outputting, via one or more output devices onboard the autonomous vehicle, the audible vehicle indication.

20 Claims, 6 Drawing Sheets

| OBJECT TYPE | TONE | DISTANCE | VOLUME | LOCATION | OUTPUT DEVICE |
|---|---|---|---|---|---|
| PEDESTRIAN | TONE 1 | >X FT. | VOL. LEVEL 1 | ZONE 1 | OUTPUT DEVICE 1 |
| BICYCLE | TONE 2 | X<_<Y | VOL. LEVEL 2 | ZONE 2 | OUTPUT DEVICE 2 |
| VEHICLE | TONE 3 | >Y | VOL. LEVEL 3 | ZONE 3 | OUTPUT DEVICE 3 |
| ... | ... | ... | ... | ... | ... |

| MOTION TYPE | TONE | DISTANCE | VOLUME | LOCATION | OUTPUT DEVICE |
|---|---|---|---|---|---|
| NUDGE | TONE 4 | >X FT. | VOL. LEVEL 1 | ZONE 1 | OUTPUT DEVICE 1 |
| LANE CHANGE | TONE 5 | X<_<Y | VOL. LEVEL 2 | ZONE 2 | OUTPUT DEVICE 2 |
| TURN | TONE 6 | >Y | VOL. LEVEL 3 | ZONE 3 | OUTPUT DEVICE 3 |
| ... | ... | ... | ... | ... | ... |

(56) References Cited

U.S. PATENT DOCUMENTS

| | | | | |
|---|---|---|---|---|
| 2017/0254880 A1* | 9/2017 | Smith | .................... | G01S 13/931 |
| 2017/0297401 A1* | 10/2017 | Hrovat | ............... | B60G 17/0165 |
| 2017/0323639 A1* | 11/2017 | Tzirkel-Hancock | ......................... B60H 1/00742 | |
| 2017/0329329 A1* | 11/2017 | Kamhi | ................... | B60W 50/14 |
| 2017/0334459 A1* | 11/2017 | McNew | ................ | B60W 50/14 |
| 2017/0369073 A1* | 12/2017 | Huber | ................ | B60W 50/0098 |
| 2018/0015878 A1* | 1/2018 | McNew | ................ | G05D 1/0088 |
| 2018/0039273 A1* | 2/2018 | Delp | .................... | G05D 1/0094 |
| 2018/0047285 A1* | 2/2018 | Johnson | ........... | G08G 1/096708 |
| 2018/0075747 A1* | 3/2018 | Pahwa | ................... | G08G 1/164 |
| 2018/0088574 A1* | 3/2018 | Latotzki | ............... | G05D 1/0061 |
| 2018/0101738 A1* | 4/2018 | Mualla | ............... | G06K 9/00805 |

* cited by examiner

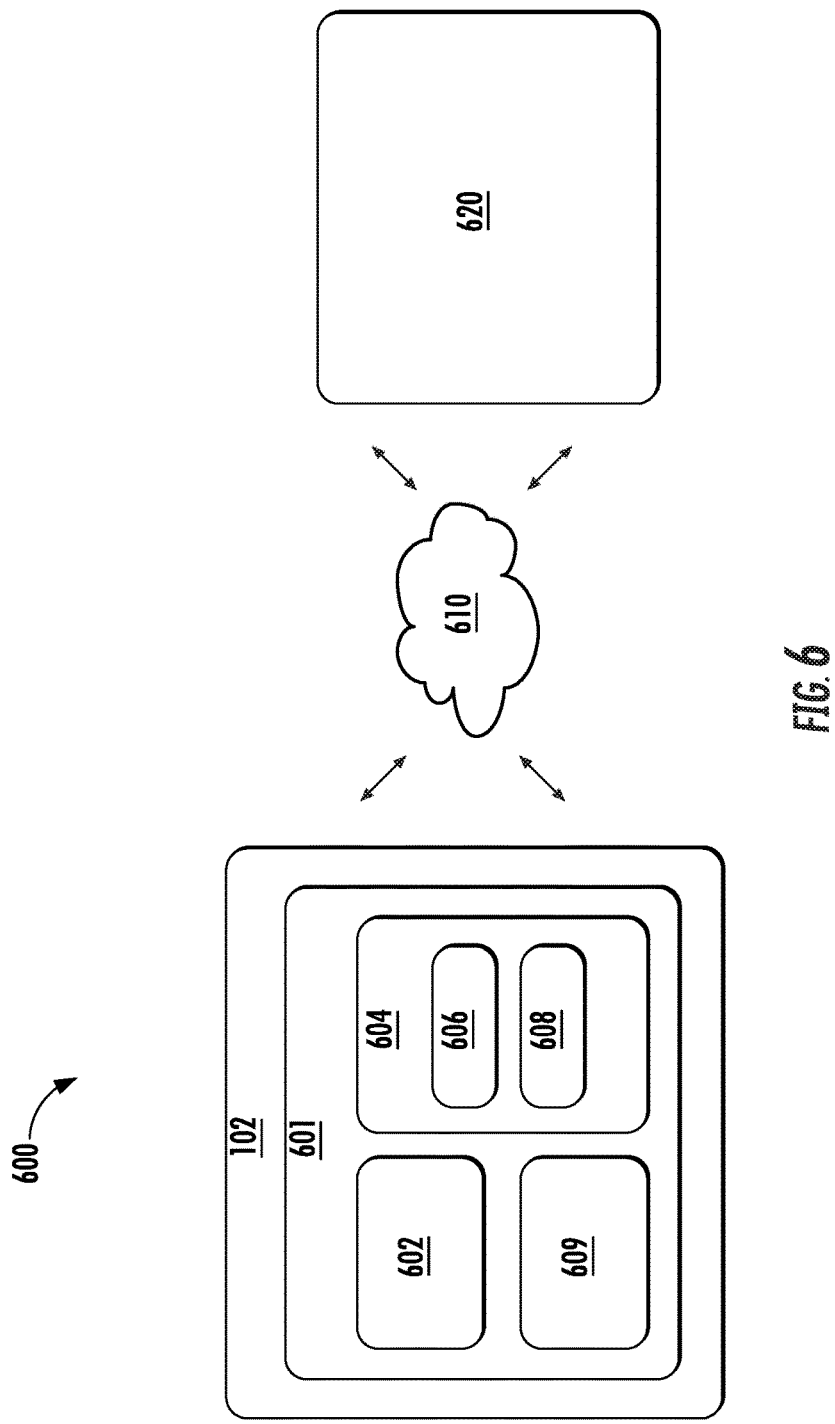

US 10,209,716 B1

SYSTEMS AND METHODS FOR COMMUNICATING AUTONOMOUS VEHICLE SCENARIO EVALUATION AND INTENDED VEHICLE ACTIONS

FIELD

The present disclosure relates generally to externally communicating the operations of a computing system of an autonomous vehicle.

BACKGROUND

An autonomous vehicle is a vehicle that is capable of sensing its environment and navigating with little to no human input. In particular, an autonomous vehicle can observe its surroundings using a variety of sensors and can attempt to comprehend the surroundings by performing various processing techniques on data collected by the sensors. Given such, the autonomous vehicle can navigate through its surroundings.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for communicating autonomous vehicle operations. The method includes obtaining, by a computing system including one or more computing devices onboard an autonomous vehicle, data associated with the autonomous vehicle. The method includes identifying, by the computing system, an object within a surrounding environment of the autonomous vehicle or a planned vehicle motion action of the autonomous vehicle based at least in part on the data associated with the autonomous vehicle. The method includes determining, by the computing system, an audible vehicle indication that is associated with the identified object or the planned vehicle motion action. The audible vehicle indication is indicative of a type of the object or a type of the planned vehicle motion. The methods include outputting, by the computing system via one or more output devices onboard the autonomous vehicle, the audible vehicle indication. The audible vehicle indication is outputted within an interior of the autonomous vehicle in a manner that is indicative of one or more locations associated with the object or one or more locations associated with the planned vehicle motion action.

Another example aspect of the present disclosure is directed to a computing system for communicating autonomous vehicle operations. The computing system includes one or more processors and one or more memory devices. The one or more memory devices store instructions that when executed by the one or more processors cause the computing system to perform operations. The operations include obtaining data associated with the autonomous vehicle. The operations include identifying an object within a surrounding environment of the autonomous vehicle or a planned vehicle motion action of the autonomous vehicle based at least in part on the data associated with the autonomous vehicle. The operations include outputting within an interior of the autonomous vehicle, via one or more output devices, an audible vehicle indication that is associated with the identified object or the planned vehicle motion action. The audible vehicle indication is indicative of a type of the object or a type of the planned vehicle motion action.

Yet another example aspect of the present disclosure is directed to an autonomous vehicle. The autonomous vehicle includes one or more output devices, one or more processors, and one or more memory devices. The one or more memory devices store instructions that when executed by the one or more processors cause the autonomous vehicle to perform operations. The operations include obtaining data associated with the autonomous vehicle. The operations include identifying an object within a surrounding environment of the autonomous vehicle or a planned vehicle action of the autonomous vehicle based at least in part on the data associated with the autonomous vehicle. The operations include determining an audible vehicle indication that is associated with the identified object or the planned vehicle motion action. The audible vehicle indication is indicative of a type of the object or a type of the planned vehicle motion. The operations include outputting, via the one or more output devices, the audible vehicle indication. The one or more output devices correspond to one or more locations associated with the object or one or more locations associated with the planned vehicle motion action.

Other example aspects of the present disclosure are directed to systems, methods, vehicles, apparatuses, tangible, non-transitory computer-readable media, and memory devices for communicating autonomous vehicle computing operations.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts example system components according to example embodiments of the present disclosure.

DETAILED DESCRIPTION

Figure 1:
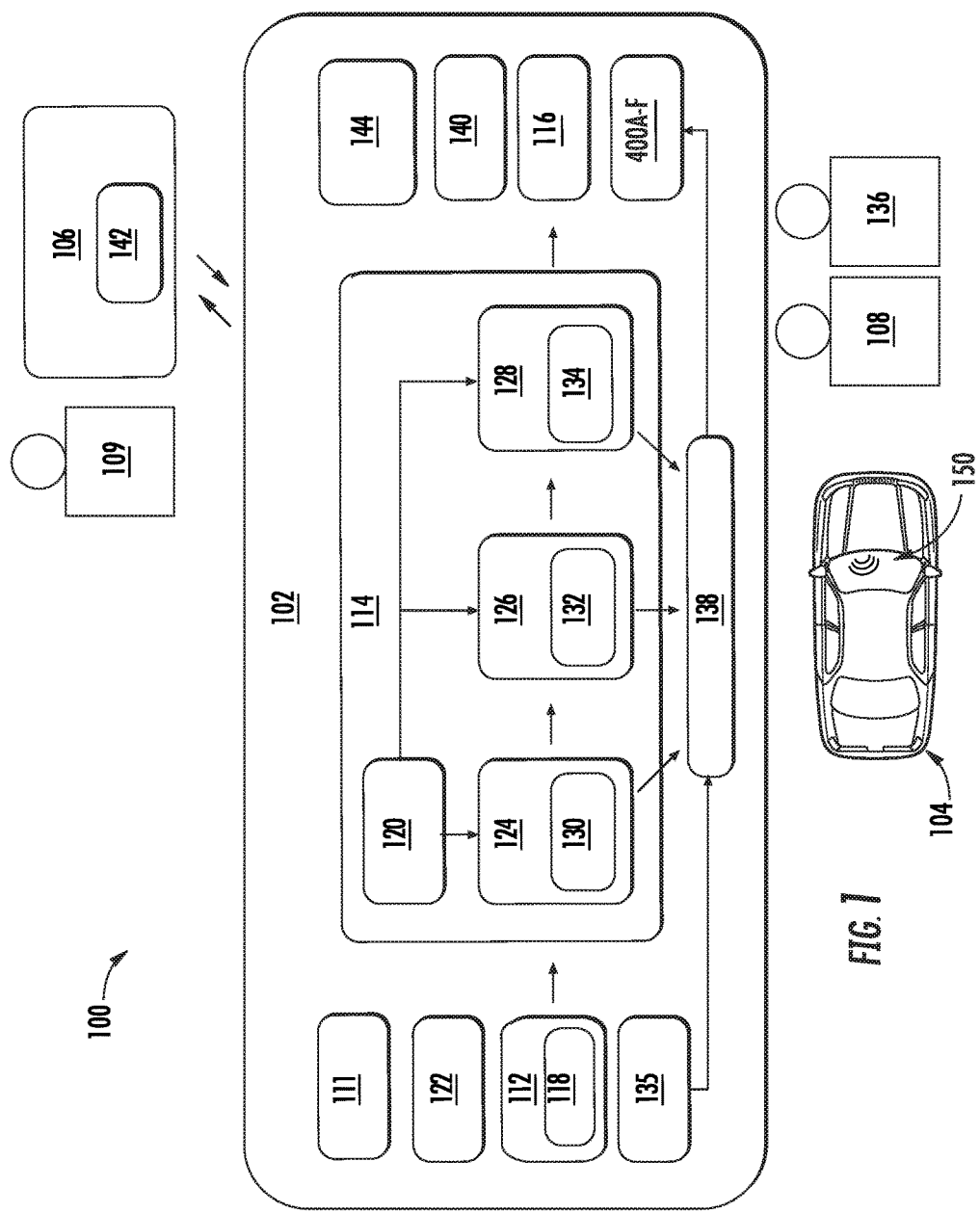
FIG. 1 depicts an example computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to conveying an autonomous vehicle's understanding of its surrounding environment, as well as the vehicle's intended actions based on such understanding. For instance, the autonomous vehicle can include an autonomy system that is configured to perform various system actions to autonomously navigate the vehicle through its surroundings. For example, the autonomy system can perceive objects (e.g., vehicles, pedestrians, bicycles, other objects) within the vehicle's surroundings and predict the respective motion of each of the objects. Moreover, the autonomy system can plan the vehicle's motion through the surrounding environment with respect to these objects and the predicted movement of the objects. The systems and methods described herein can enable an autonomous vehicle to communicate the actions of the autonomy system to an operator (e.g., located within the vehicle, remote from the vehicle) and/or another passenger of the vehicle.

To do so, the autonomous vehicle can generate audible vehicle indications that are indicative of these system actions. For example, the autonomous vehicle can identify an object within the surrounding environment that may be relevant to the vehicle's operator and/or another passenger (e.g., an object that affects the motion of the vehicle). Additionally, or alternatively, the autonomous vehicle can identify a planned vehicle motion action (e.g., of the vehicle's motion plan) that may be relevant to the vehicle's operator and/or another passenger (e.g., a nudge around object within the road). The autonomous vehicle can generate an audible vehicle indication (e.g., a sound) that is indicative of the identified object or planned vehicle motion action. The audible vehicle indication can be layered with various types of information. By way of example, the autonomous vehicle can generate an audible vehicle indication that is indicative of the type/classification of the object (e.g., via a specific tone indicative of a pedestrian) and a distance of the object relative to the vehicle (e.g., via a volume level). Moreover, the autonomous vehicle can output the audible vehicle indication via certain output devices, within the vehicle interior, to indicate the location of the object. For example, in the event that the object is (or is predicted to be) located to the front-right of the autonomous vehicle, the audible vehicle indication can be outputted via the front-right speaker in the vehicle's interior. In this way, the systems and methods of the present disclosure can efficiently communicate the operations of the vehicle's autonomy system to an operator and/or a passenger of the vehicle, thereby increasing the audience's understanding of and assurance in the vehicle's autonomous operations.

More particularly, an autonomous vehicle can be a ground-based autonomous vehicle (e.g., car, truck, bus, etc.), aerial vehicle, or another type of vehicle that can operate with minimal and/or no interaction from a human operator located within the vehicle or at a remote location. The autonomous vehicle can include a vehicle computing system located onboard the autonomous vehicle to help control the autonomous vehicle. The vehicle computing system is located onboard the autonomous vehicle, in that the vehicle computing system is located on or within the autonomous vehicle. The vehicle computing system can include one or more sensors (e.g., cameras, LIDAR, RADAR, etc.), an autonomy system (e.g., for determining and planning autonomous vehicle navigation/motion), one or more vehicle control systems (e.g., for controlling braking, steering, powertrain), etc. The sensor(s) can gather sensor data (e.g., image data, LIDAR data, RADAR data, etc.) associated with one or more object(s) that are proximate to the autonomous vehicle (e.g., within a field of view of the sensor(s)). The object(s) can include, for example, other vehicles, bicycles, pedestrians, etc. The sensor data can be indicative of characteristics (e.g., locations) associated with the object(s) at one or more times. The sensor(s) can provide such sensor data to the vehicle's autonomy system.

The autonomy computing system can be a computing system that includes various sub-systems that cooperate to perceive the surrounding environment of the autonomous vehicle and determine a motion plan for controlling the motion of the autonomous vehicle. For example, the autonomy computing system can include a perception system, a prediction system, and a motion planning system.

The perception system can be configured to perceive one or more objects within the surrounding environment of the autonomous vehicle. For instance, the perception system can process the sensor data from the sensor(s) to detect one or more objects that are proximate to the autonomous vehicle as well as obtain perception data associated therewith. The perception data for each object can describe an estimate of the object's current location (also referred to as position), current speed/velocity, current acceleration, current heading, current orientation, size/footprint, class (e.g., vehicle class vs. pedestrian class vs. bicycle class), and/or other perceived information. The perception data could also include inferred characteristics such as, for example, whether a pedestrian's gaze encompasses the current location of the autonomous vehicle.

The prediction system can be configured to predict a motion of the object(s) within the surrounding environment of the autonomous vehicle. For instance, the prediction system can create prediction data associated with one or more of the objects. The prediction data can be indicative of one or more predicted future locations and/or intended actions of each respective object. In particular, the prediction data can indicate a predicted path associated with each object. The predicted path can be indicative of a trajectory along which the respective object is predicted to travel over time (and/or the speed at which the object is predicted to travel along the predicted path).

The motion planning system can be configured to plan the motion of the autonomous vehicle. For instance, the motion planning system can determine a motion plan for the autonomous vehicle based at least in part on the perception data, prediction data, and/or other data such as, for example, a vehicle route for which the autonomous vehicle is to follow. The motion plan can include one or more planned vehicle motion actions to be implemented by the autonomous vehicle. The planned vehicle motion actions can be generated with respect to the objects proximate to the vehicle as well as the predicted movements. For instance, the motion planning system can implement an optimization algorithm that considers cost data associated with a vehicle motion action as well as other objective functions (e.g., cost functions based on speed limits, traffic lights, etc.), if any, to determine optimized variables that make up the motion plan. By way of example, the motion planning system can determine that the vehicle can perform a certain vehicle motion action (e.g., pass an object) without increasing the potential risk to the vehicle and/or violating any traffic laws (e.g., speed limits, lane boundaries, signage, etc.). The planned vehicle motion actions can be determined to control a motion of the autonomous vehicle, for example, without user input to the autonomous vehicle. The motion plan can include the planned vehicle motion actions, a planned trajectory, a vehicle speed, a vehicle acceleration, etc.

In some implementations, the autonomous vehicle can include a collision mitigation system. The collision mitigation system can include sensors that are independent from those that acquire sensor data for the autonomy computing system. The collision mitigation system can be configured as a backup safety measure that identifies object(s) with which the vehicle may potentially collide. For example, the collision mitigation system can be configured to perceive one or more objects within the surrounding environment of the vehicle and determine whether the vehicle may collide with such object(s). The collision mitigation system can determine one or more planned vehicle motion actions for the autonomous vehicle to perform in order to avoid the potential collision. Such actions can be provided as part of, or separate from, the motion plan.

The vehicle computing system can be configured to communicate the system actions of the vehicle's autonomy system to an operator (e.g., within the vehicle, remote from the vehicle) and/or another passenger within the vehicle. The autonomy system actions can include those described herein, such as, for example, object perception, object motion prediction, and/or motion planning of the autonomous vehicle. In some implementations, the autonomy system actions can include the actions performed by the vehicle's collision mitigation system (e.g., object perception, motion planning, etc.). The vehicle computing system can inform an operator and/or another passenger about an object within the vehicle's surroundings that is perceived by the autonomy system and/or a planned vehicle motion action determined by the autonomy system (and/or collision mitigation system).

To help determine what to communicate, the vehicle computing system can obtain data associated with the autonomous vehicle. The data associated with the autonomous vehicle can be data that is created onboard the autonomous vehicle as the autonomous vehicle travels through the surrounding environment (e.g., without user input from a human operator). Such data can include, for example, the perception data associated with one or more objects within a surrounding environment of the autonomous vehicle. Additionally, or alternatively, the data associated with the autonomous vehicle can include the prediction data indicative of one or more predicted future locations of the object(s) within the surrounding environment of the autonomous vehicle. In some implementations, the data can include data associated with a motion plan of the autonomous vehicle and/or data associated with a collision mitigation system of the autonomous vehicle, as described herein.

The vehicle computing system can identify an object within the surrounding environment of the vehicle and/or a planned vehicle motion action to be communicated. For instance, the autonomous vehicle can determine which objects within the surrounding environment and/or planned vehicle motion actions would be relevant to an intended audience (e.g., the operator and/or another passenger). By way of example, the perception system can perceive a plurality of objects within a surrounding environment of the autonomous vehicle. While all of these objects may be within the field of view of the vehicle's sensors, not all of the objects may be relevant to the operator and/or other passenger. In some implementations, to help determine an object's relevance, the vehicle computing system can identify a current location of each of these perceived objects based at least in part on the perception data. The vehicle computing system can determine that at least one of the perceived objects is relevant to the operator and/or a passenger based at least in part on the current location of the at least one relevant object. A relevant object may be one that is currently located near to the vehicle (e.g., within a threshold distance), one that may affect the motion of the vehicle, and/or otherwise affect the safe operation of the vehicle. Additionally, or alternatively, the relevance of the object may be based at least in part on the type of object.

In another example, the autonomy system action can include predicting one or more predicted future locations of each object of a plurality of objects perceived within the vehicle's surrounding environment. Again, not all of the objects predicted to move within the vehicle's surrounding environment may be considered relevant to an operator and/or another passenger. For instance, the prediction system can determine one or more predicted future locations of each of the objects within the vehicle's surroundings. The vehicle computing system can determine that at least one of the objects is relevant based at least in part on the one or more predicted future locations of that object. For example, an object can be considered relevant if one or more of its predicted future locations would affect the motion of the autonomous vehicle (e.g., if the predicted path of the object would intersect with the vehicle's planned trajectory).

In another example, the motion planning system can generate a motion plan that includes a plurality of planned vehicle motion actions to be implemented by the autonomous vehicle. In some implementations, not all of the vehicle motion actions may be relevant to an operator and/or a passenger. For example, one or more of the planned vehicle motion actions may cause the vehicle to maintain a certain heading and/or speed (e.g., trajectories to travel straight within a travel lane), while one or more of the vehicle actions may cause the vehicle to adjust its heading and/or speed (e.g., a movement within a travel lane, turn, motion to exit from a highway, etc.). In some implementations, the vehicle computing system can identify the vehicle motion actions that would adjust the heading and/or speed of the autonomous vehicle as relevant.

Additionally or alternatively, the vehicle computing system can determine whether an object and/or planned vehicle motion action is relevant based at least in part on the intended audience. For instance, some objects and/or planned vehicle motion actions may be considered relevant to a vehicle operator but not to another passenger (e.g., a customer of a transportation service). By way of example, several of the objects within the surrounding environment (e.g., within a threshold distance) may be relevant to an operator that desires to evaluate whether the perception system is accurately perceiving objects around the vehicle (e.g., without reviewing visual indicators, system data, etc.). However, a passenger that is using the autonomous vehicle as a transportation service may only be interested in objects that are nearest to the vehicle and/or that would affect the motion of the vehicle (e.g., as an assurance of the autonomy system's proper operation). In another example, an operator may be interested in all of the planned vehicle motion actions of a motion plan to evaluate the performance of the vehicle's motion planning system, while a customer of a transportation service may only be interested in certain vehicle motion actions that would affect the heading and/or speed of the vehicle (e.g., a vehicle stop, a nudge action, a lane change, a turn, etc.). In some implementations, an operator and/or passenger may specify which objects and/or planned vehicle motion actions are to be communicated to the operator and/or passenger (e.g., via user input to a human-machine interface onboard the vehicle). Accordingly, the vehicle computing system can filter which objects and/or planned vehicle motions actions to communicate based at least in part on the intended audience. This can enable the vehicle computing system to ensure that only the objects and/or planned vehicle motion actions considered relevant to the intended audience are communicated to that party.

The vehicle computing system can determine an audible vehicle indication that is associated with an object within the vehicle's surrounding environment or a planned vehicle motion action. The audible vehicle indication can be an audible sound with a plurality of audible characteristics designed to communicate a variety of information. The type of information layered within the audible vehicle indication can vary depending on the system action. For example, when communicating information associated with object perception and/or object motion prediction, the vehicle computing system can generate an audible vehicle indication that indicates a type of the object, a distance of the object relative to the autonomous vehicle, the current location of the object relative to the autonomous vehicle, and/or one or more predicted future locations of the object relative to the autonomous vehicle. When communicating information associated with the motion planning of the autonomous vehicle, the vehicle computing system can generate an audible vehicle indication that indicates a type of a planned vehicle motion action and one or more locations associated with the planned vehicle motion action (e.g., the direction of the action, where the action is to occur, etc.). Moreover, the vehicle's planned motion can also take into account known features indicated via map data (e.g., stop signs), knowledge of the scene state (e.g., traffic light state as perceived or as transmitted via infrastructure communication), and/or other information. Planned vehicle behavior in response to these features may also trigger audivle vehicle indications (e.g., acoustic cues alerting an operator that the vehicle is aware of the presence or state an upcoming traffic light, or reassuring a passenger that the vehicle will be stopping for an upcoming stop sign).

In some implementations, to help formulate the audible vehicle indication, the vehicle computing system can access a data structure stored, for example, in a memory onboard the autonomous vehicle. The data structure can include a rule, table, list, tree, and/or other type of data structure. The data structure can indicate a plurality of auditory characteristics. For instance, the data structure can indicate which auditory characteristics are to be used for communicating certain types of information associated with an object and/or a planned vehicle motion action. By way of example, different sounds can be used to indicate different types of objects. In some implementations, a first tone (e.g., a beep at a first octave) can be used to indicate a pedestrian; a second tone (e.g., a beep at a second octave) can be used on indicate a bicycle; a third tone (e.g., a beep at a third octave) can be used to indicate a vehicle, etc. Additionally, or alternatively, different sounds can be used to indicate different types of vehicle motion actions. For example, a fourth tone (e.g., a beep at a fourth octave) can be used to indicate a nudge action within the vehicle's travel lane; a fifth tone (e.g., double-beep at the fourth octave) can be used on indicate a lane change; a sixth tone (e.g., triple-beep at the fourth octave) can be used to indicate a turn, etc.

The data structure can also indicate which auditory characteristics (e.g., volume levels) are to be used to indicate the distance of the object relative to the autonomous vehicle and/or the distance until a planned vehicle motion action is to be performed by the vehicle. For instance, different volume levels can be used to indicate different distance ranges. By way of example, the volume level of the vehicle audible indication (e.g., the sound associated therewith) can correlate to the relative distance between the object and the autonomous vehicle (e.g., the higher the decibel level/louder the volume, the closer the object is to the vehicle). For planned vehicle motion actions, the volume level of the vehicle audible indication can correlate to the relative distance until the autonomous vehicle is to perform the planned vehicle motion action (e.g., the higher the decibel level/louder the volume, the closer the vehicle is to performing the planned vehicle motion action).

The data structure can also indicate how the auditory vehicle indication is to indicate the location(s) of an object relative to the autonomous vehicle and/or the location(s) associated with a planned vehicle motion action. For instance, the autonomous vehicle can include a plurality of output devices. The output devices can include audible output devices, such as, for example, speakers. The output devices can be positioned throughout the interior of the vehicle. For example, an output device can be positioned on the front-left side of the vehicle (e.g., at the driver's side door), another output device can be positioned in the center of the front of the vehicle (e.g., at the center of the dash board), another output device can be positioned on the front-right side of the vehicle (e.g., at the front passenger's side door), another output device can be positioned at the back-right side of the vehicle (e.g., at the rear right-side passenger door), another output device can be positioned at the rear of the vehicle (e.g., near the center of the vehicle trunk), and another output device can be positioned at the back-left side of the vehicle (e.g., at the rear left-side passenger door).

The data structure can indicate how the vehicle computing system can leverage these various output devices to communicate the location(s) associated with an object and/or a planned vehicle motion action. For instance, the vehicle computing system can determine one or more locations associated with the identified object (e.g., relevant object) and/or a planned vehicle motion action (e.g., relevant vehicle motion action). By way of example, the vehicle computing system can determine that the current location of an object is located to the front-right side of the vehicle. The data structure can indicate that for this location, the audible vehicle indication can be outputted via the output device positioned on the front-right side of the vehicle (e.g., at the front passenger's side door) in order to indicate this location of the object relative to the vehicle. In another example, the vehicle computing system can determine that an object is predicted to travel to one or more predicted future locations that form a right-to-left path in front of the vehicle (e.g., a pedestrian travelling right-to-left along a crosswalk). The data structure can indicate that for these location(s), the audible vehicle indication can be outputted in a sequence starting with the output device positioned on the front-right side of the vehicle (e.g., at the front passenger's side door), then via the output device positioned in the center of the front of the vehicle (e.g., at the center of the dash board), and then via the output device positioned on the front-left side of the vehicle (e.g., at the driver's side door). In this way, the autonomous vehicle can communicate the predicted future location(s) of the object relative to the vehicle. In another example, the vehicle computing system can determine that the vehicle is to nudge to the left (e.g., move left within its travel lane). The data structure can indicate that for the location associated with this planned vehicle motion action (e.g., a leftward motion), the audible vehicle indication can be outputted via the output device positioned on the front-left side of the vehicle (e.g., at the driver's side door) and/or the output device positioned at the back-left side of the vehicle (e.g., at the rear left-side passenger door).

In some implementations, the audible vehicle indication can indicate the intentions of an object relative to the autonomous vehicle. For example, the vehicle computing system can determine the intention of an object with respect to the autonomous vehicle based at least in part on the object's motion relative to the autonomous vehicle (e.g., the object's location, velocity, acceleration, and/or other characteristics). The intention of the object can be indicative of whether the object is unfriendly (e.g., acting/will likely be acting harmful or potentially harmful) or friendly (e.g., not acting/will not likely be acting harmful or potentially harmful) to the autonomous vehicle. The data structure can indicate one or more auditory characteristics to be used to properly convey the intention of the object. For instance, the frequency (e.g., number of outputs per timeframe) with which the audible vehicle indication is outputted can indicate the intention of the object. By way of example, the data structure can indicate that for an unfriendly object the audible vehicle indication can be outputted repetitively, at higher frequency (e.g., X times per Y second(s)) than for a friendly object (e.g., which maybe outputted only once).

In some implementations, the audible characteristics can vary depending on the intended audience. For instance, the vehicle computing system may communicate a type of an object differently to a vehicle operator (e.g., that may be trained to recognize certain tones) than another passenger (e.g., a customer of a transportation service that is not familiar with specialized tones). By way of example, the data structure can specify that for a vehicle operator, the audible vehicle indication is to include a tone (e.g., a beep) to indicate the type of object to the vehicle operator. The data structure can further specify that for another passenger, the audible vehicle indication is to include a voice message (e.g., a one-word message stating "pedestrian," "bicycle," "vehicle," etc.) to indicate the type of object to the passenger (who is not specifically trained to identify certain tones). In this way, the vehicle computing system can adapt the audible vehicle indication to the level of experience that an individual may have with the autonomous vehicle.

The vehicle computing system can output the audible vehicle indication via one or more output device(s). For instance, the vehicle computing system can output the audible vehicle indication via the output device(s) such that the audible vehicle indication is audible within the interior of the autonomous vehicle. In some implementations, the vehicle computing system can provide data indicative of auditory vehicle indication to a computing system that is remote from the autonomous vehicle. This can allow, for example, the audible vehicle indication to be outputted to a remote operator of the autonomous vehicle.

The vehicle computing system can output the audible vehicle indication as a layered combination of the auditory characteristics (e.g., designated by the data structure) to concurrently communicate various types of information. By way of example, for an object perceived within the surrounding environment of the autonomous vehicle, the vehicle computing system can output an audible vehicle indication that includes a tone (e.g., indicating the type of object), at a certain volume (e.g., to indicate the relative distance from the object to the vehicle), via one or more selected output devices at certain positions within the vehicle (e.g., to indicate the location of the object and/or its predicted motion). In some implementations, the audible vehicle indication can be outputted at higher frequency (e.g., in a repetitive manner) to indicate that the object is unfriendly to the vehicle. In another example, for a planned vehicle motion action, the vehicle computing system can output an audible vehicle indication that includes a tone (e.g., to indicate the type of vehicle maneuver), at a certain volume (e.g., to indicate the relative distance until the vehicle maneuver), via one or more selected output devices at certain positions within the vehicle (e.g., to indicate the location(s) associated with the vehicle maneuver).

In some implementations, the vehicle computing system can output the audible vehicle indication based at least in part on a level of attentiveness of the operator within the autonomous vehicle. The autonomous vehicle can include one or more sensors within the interior of the vehicle to determine whether the operator (e.g., positioned in a driver's seat) is paying attention to the travel way and/or vehicle actions. For example, the autonomous vehicle can include one or more sensors configured to acquire data associated with an operator (e.g., located within the autonomous vehicle). Such data can include, for example, data indicative of whether the operator has removed his/her hands from a steering mechanism (e.g., steering wheel), data indicative of whether the operator's eyes have deviated from the vehicle's travel way, and/or whether the operator's body language is indicative of potential inattentiveness (e.g., head bobbing due to fatigue). The vehicle computing system can obtain data associated with the operator and determine a level of attentiveness associated with the operator based at least in part on such data. The vehicle computing system can output the audible vehicle indication based on the level of attentiveness. For example, in the event that the driver's eyes have deviated from the travel way, the vehicle computing system can output the audible vehicle indication that is indicative of a state of a perceived object within the autonomous vehicle, to help regain the operator's attention. In some implementations, the vehicle computing system can output background noise (e.g., continuously, with the audible vehicle indication, etc.) to help maintain operator attentiveness.

The systems and methods described herein may provide a number of technical effects and benefits. More particularly, the systems and methods enable an autonomous vehicle to generate a synthetic soundscape that layers information about the self-operating (e.g., self-driving) state of the autonomous vehicle. More particularly, the systems and methods allow the vehicle's computing system to generate and output audible vehicle indications that quickly inform an operator and/or another passenger as to whether the vehicle's autonomy system is operating correctly, what objects the autonomy system is perceiving/predicting motion, what the autonomy system is planning to do in the future (e.g., via the motion plan), etc.

The systems and methods of the present disclosure help convey the operations of the vehicle's autonomy system to a variety of intended audiences. For example, this approach allows a passenger within the vehicle (e.g., a customer of a transportation service) to quickly gain context of the vehicle's autonomy operation, improving the passenger's assurance that that autonomous vehicle understands its surrounding environment and is appropriately planning its motion with respect to that environment. For operators within the vehicle, the customized audible vehicle indications allow an operator to quickly evaluate whether the autonomy system is operating correctly. Moreover, as described herein, the audible vehicle indications use tailored sounds that cause the operator to maintain higher readiness and allow the operator to rapidly regain driving context in the event the operator assumes control of the autonomous vehicle. The systems and methods allow a single operator to understand the state of the vehicle's autonomy system without the need for another co-operator within the vehicle to continuously review and report feedback data to the operator and/or with the operator having to review a user interface or other visual indication. As such, the systems and methods of the present disclosure overcome the latency and potential communication shortfalls that can arise from relying on a co-operator to convey information (e.g., in sentence format) and/or the operator having to review a visual output.

The systems and methods also provide benefits for the remote control of the autonomous vehicle, if needed. For example, the audible vehicle indications can utilize a consistent conversion of scene characteristics into soundscape, making it much easier for a remote operator to remotely gain context of the autonomous vehicle's situation. Furthermore, the audible vehicle indications of the present disclosure allow for easier/faster/lower bandwidth requirements than full immersive video (e.g., via a live feed from the autonomous vehicle).

The systems and methods of the present disclosure also provide an improvement to vehicle computing technology, such as autonomous vehicle computing technology. For instance, the computer-implemented methods and systems improve the ability of the vehicle computing technology to communicate its internal decision making/processes to an intended audience (e.g., individuals within the vehicle, a remote operator). For example, the systems and methods can enable a computing system (e.g., onboard an autonomous vehicle) to obtain data associated with the autonomous vehicle (e.g., perception data, prediction data, motion planning data, etc.) and identify an object within the surrounding environment of the autonomous vehicle or a planned vehicle motion action of the autonomous vehicle based at least in part on such data. In some implementations, the computing system can filter the plurality of perceived objects within the vehicle's surroundings and/or the plurality of planned vehicle motion actions to identify an object and/or action that may be relevant (e.g., to an intended audience). The computing system can determine an audible vehicle indication that is associated with the identified object or the planned vehicle motion action. The audible vehicle indication can include layers of information that can be communicated quickly and concurrently to the intended audience (e.g., object/action type, location(s), intentions, etc.). For example, the audible vehicle indication can employ continuous changes in tone, volume, etc., as well as discrete sounds to indicate different conditions, actions, etc., and can be layered with continual/intermittent background sound designed to maintain alertness. The computing system can output the audible vehicle indication via the output device(s) onboard the autonomous vehicle, within the interior of the autonomous vehicle (e.g., to reflect the location(s) of the identified object and/or planned vehicle motion action). In this way, the computing system can leverage the existing vehicle audio system (e.g., surround sound capability) to introduce audible indicators with spatial characteristics. Accordingly, the vehicle computing system can generate and provide audible vehicle indications that efficiently provide a variety of information to its audience via the customized auditory characteristics and output devices onboard the vehicle. This efficiency can result in less strain on the vehicle's onboard processors and output devices as would be required by longer messages. Moreover, the ability to filter out objects/actions that are not relevant to the intended audience can avoid the creation and output of unnecessary audible indications, thereby further saving processing, storage, and output resources.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104. In some implementations, the system 100 can include an operations computing system 106 that is remote from the vehicle 104.

In some implementations, the vehicle 104 can be associated with an entity (e.g., a service provider, owner, manager). The entity can be one that offers one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which a passenger rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user.

The operations computing system 106 can include one or more computing devices that are remote from the vehicle 104 (e.g., located off-board the vehicle 104). For example, such computing device(s) can be components of a cloud-based server system and/or other types of computing systems that can communicate with the vehicle computing system 102 of the vehicle 104. The computing device(s) of the operations computing system 106 can include various components for performing various operations and functions. For instance, the computing device(s) can include one or more processor(s) and one or more tangible, non-transitory, computer readable media (e.g., memory device(s)). The one or more tangible, non-transitory, computer readable media can store instructions that when executed by the one or more processor(s) cause the operations computing system 106 (e.g., the one or more processors, etc.) to perform operations and functions, such as providing data to the vehicle 104 and/or receiving data from the vehicle 104, managing a fleet of vehicles (that includes the vehicle 104), remotely controlling a vehicle, etc.

The vehicle 104 incorporating the vehicle computing system 102 can be a ground-based autonomous vehicle (e.g., car, truck, bus, etc.), an air-based autonomous vehicle (e.g., airplane, helicopter, or other aircraft), or other types of vehicles (e.g., watercraft, etc.). The vehicle 104 can be an autonomous vehicle that can drive, navigate, operate, etc. with minimal and/or no interaction from a human operator 108 (e.g., driver) and/or a remote operator 109 that is remote from the vehicle 104. For example, the autonomous vehicle can be a fully autonomous vehicle and/or an automated vehicle that operates at less than fully autonomy (e.g., with at least some input from a human operator). In some implementations, a human operator 108 can be omitted from the vehicle 104 (and/or also omitted from remote control of the vehicle 104). In some implementations, a human operator 108 can be included in the vehicle 104 and/or a remote operator 109 may be able to control the vehicle 104 from a remote location.

The vehicle 104 can be configured to operate in a plurality of operating modes. The vehicle 104 can be configured to operate in a fully autonomous (e.g., self-driving) operating mode in which the vehicle 104 is controllable without user input (e.g., can drive and navigate with no input from a human operator 108 present in the vehicle 104 and/or a remote operator 109 that is remote from the vehicle 104). The vehicle 104 can operate in a semi-autonomous operating mode in which the vehicle 104 can operate with some input from a human operator 108 present in the vehicle 104 (and/or an operator 109 that is remote from the vehicle 104). The vehicle 104 can enter into a manual operating mode in which the vehicle 104 is fully controllable by a human operator 108 (e.g., human driver, pilot, etc.) present in the vehicle 104 and/or a remote operator 109 and can be prohibited from performing autonomous navigation (e.g., autonomous driving). In some implementations, the vehicle 104 can implement vehicle operating assistance technology (e.g., collision mitigation system, power assist steering, etc.) while in the manual operating mode to help assist the human operator 108 of the vehicle 104.

The operating modes of the vehicle 104 can be stored in a memory onboard the vehicle 104. For example, the operating modes can be defined by an operating mode data structure (e.g., rule, list, table, etc.) that indicates one or more operating parameters for the vehicle 104, while in the particular operating mode. For example, an operating mode data structure can indicate that the vehicle 104 is to autonomously plan its motion when in the fully autonomous operating mode. The vehicle computing system 102 can access the memory when implementing an operating mode.

In some implementations, the generation and/or output of audible vehicle indications can be based at least in part on the operation mode of the vehicle 104. For example, the vehicle computing system 102 can be configured to determine and/or output audible vehicle indications when the vehicle 104 is in the fully autonomous and/or semi-autonomous operating mode(s). Additionally, or alternatively, the vehicle computing system 102 can be disabled from and/or otherwise prevented from generating and/or outputting audible vehicle indications when in the manual operating mode.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode. By way of example, the operations computing system 106 can send one or more control signals to the vehicle 104 instructing the vehicle 104 to enter into the fully autonomous operating mode. Such control signal(s) can be sent in response to a command from a remote operator 109 of the vehicle 104. In some implementations, the operating mode of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted based at least in part on a sequence of interfaces located on the vehicle 104. For example, the operating mode may be adjusted by manipulating a series of interfaces in a particular order to cause the vehicle 104 to enter into a particular operating mode.

The vehicle 104 can include a communications system 111 configured to allow the vehicle computing system 102 (and its computing device(s)) to communicate with other computing devices. The vehicle computing system 102 can use the communications system 111 to communicate with the operations computing system 106 and/or one or more other remote computing device(s) over one or more networks (e.g., via one or more wireless signal connections). In some implementations, the communications system 111 can allow communication among one or more of the system(s) on-board the vehicle 104. The communications system 111 can include any suitable components for interfacing with one or more network(s), including, for example, transmitters, receivers, ports, controllers, antennas, and/or other suitable components that can help facilitate communication.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle 104 (e.g., its computing system, one or more processors, etc.) to perform operations and functions, such as those described herein for communicating autonomous vehicle operations.

As shown in FIG. 1, the vehicle 104 can include one or more sensors 112, an autonomy computing system 114, one or more vehicle control systems 116, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, pedestrians, vehicles, bicycles, and/or other objects. The object(s) can be located in front of, to the rear of, and/or to the side of the vehicle 104. The sensor data 118 can be indicative of locations associated with the object(s) within the surrounding environment of the vehicle 104 at one or more times. The sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 104 in comprehending and perceiving its surrounding environment and its relationship thereto. In some implementations, the vehicle computing system 102 can determine a vehicle route for the vehicle 104 based at least in part on the map data 120.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more objects that are proximate to the vehicle 104 based at least in part on the sensor data 118 and/or the map data 120. For example, the perception system 124 can obtain perception data 130 descriptive of a current state of an object that is proximate to the vehicle 104. The perception data 130 for each object can describe, for example, an estimate of the object's current and/or past: location (also referred to as position); speed (also referred to as velocity); acceleration; heading; orientation; size/footprint (e.g., as represented by a bounding shape); class (e.g., pedestrian class vs. vehicle class vs. bicycle class), and/or other state information. The perception system 124 can provide the perception data 130 to the prediction system 126 (e.g., for predicting the movement of an object).

The prediction system 126 can create prediction data 132 associated with some or all of the respective one or more objects proximate to the vehicle 104. For example, the prediction system 126 can implement one or more algorithms to create the prediction data 132 based at least in part on the perception data 130. The prediction data 132 can be indicative of one or more predicted future locations of each respective object. The prediction data 132 can be indicative of a predicted path (e.g., predicted trajectory) of at least one object within the surrounding environment of the vehicle 104. For example, the predicted path (e.g., trajectory) can indicate a path along which a respective object is predicted to travel over time (and/or the speed at which the object is predicted to travel along the predicted path). The prediction data 132 can be created iteratively at a plurality of time steps such that the predicted movement of the objects can be updated, adjusted, confirmed, etc. over time. The prediction system 126 can provide the prediction data 132 associated with the object(s) to the motion planning system 128.

The motion planning system 128 can determine a motion plan 134 for the vehicle 104 based at least in part on the prediction data 132 (and/or other data). The motion plan 134 can include vehicle actions with respect to the objects proximate to the vehicle 104 as well as the predicted movements. The vehicle actions can include planned vehicle motion actions that can direct the motion of the vehicle (e.g., along a planned trajectory). For instance, the motion planning system 128 can implement an optimization algorithm that considers cost data associated with a planned vehicle motion action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, other actions, etc. of the vehicle 104. The motion plan 134 can be indicative of planned vehicle motion actions (e.g., actions to be taken by the vehicle 104 at a time and/or location) and/or other actions, as well as the time and/or location at which these actions are to be taken by the vehicle 104.

The vehicle computing system 102 can cause the vehicle 104 to act in accordance with the motion plan 134. For example, the motion planning system 128 can provide the motion plan 134 with data indicative of the planned vehicle motion actions, a planned trajectory, and/or other operating parameters to the vehicle control system(s) 116 to implement the motion plan 134 for the vehicle 104. For instance, the vehicle 104 can include a controller configured to translate the motion plan 134 into instructions. By way of example, the controller can translate a planned vehicle motion action into instructions to adjust the steering of the vehicle 104 "X" degrees, apply a certain magnitude of braking force, etc. The controller can send one or more control signals to the responsible vehicle control component (e.g., braking control system, steering control system, acceleration control system) to execute the instructions and implement the planned vehicle motion action.

In some implementations, the vehicle 104 can include a collision mitigation system 135. The collision mitigation system 135 can be independent from the autonomy computing system 114. In some implementations, the collision mitigation system 135 can include sensors that are independent from the sensor(s) 112 that acquire sensor data 118 for the autonomy computing system 114. The collision mitigation system 135 can be configured as a backup safety measure that identifies object(s) with which the vehicle 104 may potentially collide. The collision mitigation system 135 can determine one or more planned vehicle motion actions for the vehicle 104 to perform to avoid the potential collision. Such actions can be provided as part of, or separate from, the motion plan.

The collision mitigation system 135 can monitor a surrounding environment of the vehicle 104 using sensor(s) (e.g., a Radio Detection and Ranging (RADAR) system, one or more cameras, and/or other types of image capture devices and/or sensors) associated therewith. The collision mitigation system 135 can identify one or more object(s) in the surrounding environment based at least in part on information provided by its associated sensor(s). The collision mitigation system 135 can detect one or more potential collision(s) with the identified object(s). When a potential collision is detected, the collision mitigation system 135 can control the vehicle 104 to avoid the potential collision. For example, the collision mitigation system 135 can provide information associated with the potential collision to the autonomy computing system 114, which can adjust a trajectory of the vehicle 104 to avoid the potential collision. In some implementations, the collision mitigation system 135 can send control signal(s) to the control system(s) 116 to adjust a motion of the vehicle 104 (e.g., to activate a braking system). Additionally, or alternatively, the collision mitigation system 135 can send one or more control signals to activate a warning within the interior of the vehicle 104 (e.g., to warn an operator, passenger, etc. within the vehicle 104).

The vehicle computing system 102 can communicate the system actions of the autonomy computing system 114 to an operator 108, 109 (e.g., within the vehicle 104, remote from the vehicle 104) and/or a passenger 136 within the vehicle 104 (e.g., a rider of the vehicle 104 for a transportation service). For example, the vehicle computing system 102 can include an audible indication generator system 138 that is configured to generate an audible vehicle indication 150 that is indicative of the actions of the vehicle computing system 102, as described herein. For example, the audible indication generator system 138 can generate audible vehicle indication(s) 150 that are indicative of the systems actions of the autonomy computing system 114. These can include for example, object perception, object motion prediction, and/or motion planning of the vehicle 104. In some implementations, the audible vehicle indication(s) 150 can be indicative of the system actions performed by the collision mitigation system 135 (e.g., object perception, motion planning, etc.). For example, the vehicle computing system 102 can inform an operator 108, 109 (e.g., within the vehicle 104, remote from the vehicle 104) and/or another passenger 136 about an object within the vehicle's surrounding environment that is perceived by the perception system 124 and/or a planned vehicle motion action determined by the motion planning system 128 (and/or collision mitigation system 135).

To help determine what information to communicate, the vehicle computing system 102 (e.g., the audible indication generator system 138) can obtain data associated with the vehicle 104. The data associated with the vehicle 104 can be data that is created onboard the vehicle 104, for example, as the vehicle 104 travels through its surrounding environment (e.g., without user input from a human operator 108, 109). Such data can include, for example, the perception data 130 associated with one or more objects within a surrounding environment of the vehicle 104. Additionally, or alternatively, the data associated with the vehicle 104 can include the prediction data 132 indicative of one or more predicted future locations of the object(s) within the surrounding environment of the vehicle 104. In some implementations, the data can include data associated with a motion plan 134 of the vehicle 104 and/or data associated with a collision mitigation system 135 of the vehicle 104.

Figure 2:
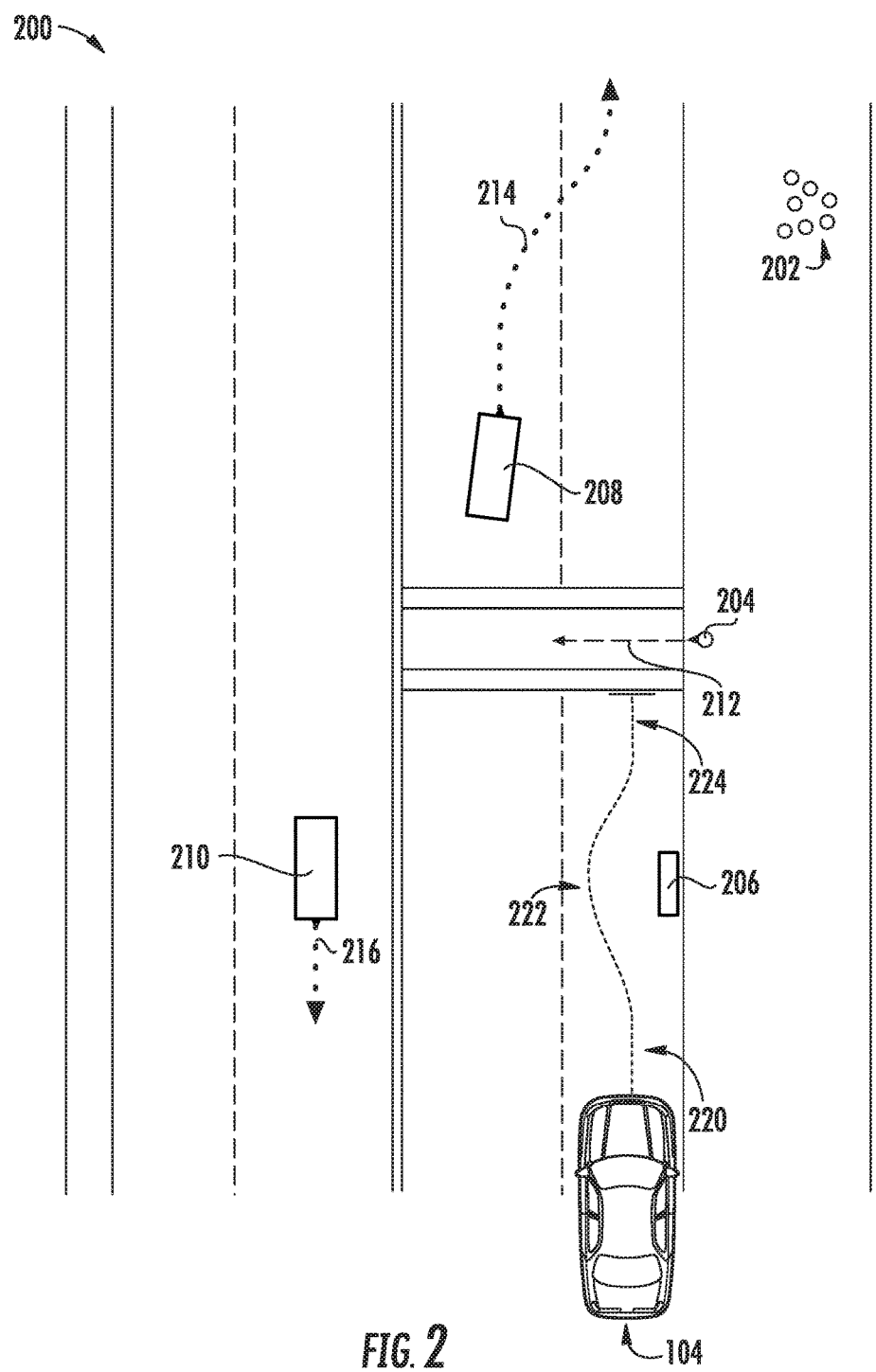
FIG. 2 depicts a diagram of an example environment of a vehicle according to example embodiments of the present disclosure.

The vehicle computing system 102 (e.g., the audible indication generator system 138) can identify a system action to communicate to a user based at least in part on the data associated with the vehicle 104. For instance, the vehicle computing system 102 can identify an object within the surrounding environment of the vehicle 104 and/or a planned vehicle motion action of the vehicle 104 based at least in part on the data associated with the vehicle 104. For example, FIG. 2 depicts a diagram of an example environment 200 of the vehicle 104 according to example embodiments of the present disclosure. The vehicle computing system 102 (e.g., the audible vehicle indication generator system 138) can identify one or more objects located within the surrounding environment 200 of the vehicle 104 based at least in part on, for example, the sensor data 118 and/or the perception data 130. For example, the vehicle computing system 102 identify a plurality of first objects 202 (e.g., a crowd of pedestrians standing on a sidewalk), a second object 204 (e.g., a moving pedestrian), a third object 206 (e.g., a parked vehicle), a fourth object 208 (e.g., a vehicle within a same travel way), a fifth object 210 (e.g., a vehicle in another travel way), and/or other objects. The vehicle computing system 102 can determine one or more predicted future locations of the objects (e.g., prediction data 132). For example, the vehicle computing system 102 can predict that the second object 204 will travel to one or more future locations 212 (e.g., across a crosswalk in accordance with a predicted trajectory). The vehicle computing system 102 can predict that the fourth object 208 will travel to one or more future locations 214 (e.g., change travel lanes in accordance with a predicted trajectory). Additionally, or alternatively, the vehicle computing system 102 can predict that the fifth object 210 will travel to one or more future locations 216 (e.g., within a current travel lane in accordance with a predicted trajectory).

The vehicle computing system 102 (e.g., the audible vehicle indication generator system 138) can identify a planned vehicle motion action of the vehicle 104 based at least in part on the motion planning data 134 (and/or data associated with the collision mitigation system 135). For example, the motion planning system 128 can determine a plurality of planned vehicle motion actions 220-224 for the vehicle 104. A first planned vehicle motion action 220 can include traveling straight within a travel way (maintaining a current trajectory). A second planned vehicle motion action 222 can include a nudge action within the vehicle's travel lane. A third planned vehicle motion action 224 can include a stop action (e.g., in front of a crosswalk).

The vehicle computing system 102 can determine which objects 202-210 within the surrounding environment 200 and/or planned vehicle motion actions 220-224 would be relevant to an intended audience (e.g., an operator 108, 109, a passenger 136). For instance, while all of the objects 202-210 may be within the field of view of the vehicle's sensors, not all of the objects 202-210 may be relevant to the operator 108, 109 and/or a passenger 136. In some implementations, a relevant object may be one that is currently located near to the vehicle 104 (e.g., within a threshold distance), an object that may affect the motion of the vehicle 104, and/or an object that may otherwise affect the safe operation of the vehicle 104. In some implementations, a relevant planned vehicle motion action may be one that adjusts the heading and/or speed of the vehicle 104. The vehicle computing system 102 can determine the relevance of an object 202-210 and/or planned vehicle motion actions 220-224 based on one or more factors.

In some implementations, an object's relevance can be based at least in part on a current location of the object. By way of example, the vehicle computing system 102 (e.g., the audible vehicle indication generator system 138) can identify a current location of an object based at least in part on data associated with the vehicle 104 (e.g., sensor data 118, perception data 130). The vehicle computing system 102 can determine that an object is relevant to an intended audience based at least in part on the current location of the respective object. For example, the vehicle computing system 102 can determine that the third object 206 (e.g., a parked vehicle) is relevant to an intended audience because it is located near the vehicle 104 while in its current location.

Additionally, or alternatively, the relevance of an object may be based at least in part on the type of object. For example, the vehicle computing system 102 can determine a type of an object based at least in part on the perception data 130 (e.g., the classification of the object). The vehicle computing system 102 can determine that an object is relevant based at least in part on the type of the object. For example, an object 204 that is identified as a pedestrian may be considered relevant to an operator 108, 109 and/or a passenger 136 because such individuals may be interested to know that the vehicle 104 properly perceives the pedestrians within its surrounding environment 200.

In some implementations, the relevance of an object can be based at least in part the predicted future location(s) of an object. For example, the vehicle computing system 102 (e.g., the audible vehicle indication generator system 138) can determine one or more predicted future locations of an object within the vehicle's surrounding environment 200 (e.g., based on the prediction data 132). The vehicle computing system 102 can determine that the object is relevant to an intended audience (e.g., of an audible vehicle indication 150) based at least in part on the one or more predicted future locations of the object. By way of example, not all of the objects predicted to move within the vehicle's surrounding environment 200 may be considered relevant to an operator 108, 109 and/or a passenger 136. An object may be considered relevant if one or more of its predicted future locations would affect the motion of the vehicle 104 and/or if the predicted trajectory of the object would intersect with the vehicle's planned trajectory. For example, the vehicle computing system 102 can determine that the second object 204 would be relevant to an operator 108, 109 and/or a passenger 136 because the predicted future location(s) 212 of the second object 204 would cause the vehicle 104 to stop and/or would intersect the vehicle's plan trajectory (if the vehicle 104 were to continue within the travel lane). Additionally, or alternatively, the vehicle computing system 102 may consider the fourth object 208 as relevant because the predicted trajectory of the fourth object 208 (e.g., into the travel lane of the vehicle 104) may affect the motion of the vehicle 104.

The relevance of a planned vehicle motion action can be based at least in part on various characteristics of the vehicle action. For instance, the vehicle computing system 102 (e.g., the audible vehicle indication generator system 138) can determine that a planned vehicle motion action is relevant to an intended audience (e.g., of the audible vehicle indication 150) based at least in part on at least one of a type of the planned vehicle motion action or an effect of the planned vehicle motion action on at least one of a heading, a speed, or another characteristic of the vehicle 104. By way of example, the motion planning system 128 can generate a motion plan that includes a plurality of planned vehicle motion actions 220-224 to be implemented by the vehicle 104. In some implementations, not all of the planned vehicle motion actions 220-224 may be relevant to an operator 108, 109 and/or a passenger 136. For example, the first planned vehicle motion action 220 may cause the vehicle 104 to maintain a certain heading and/or speed (e.g., one or more trajectories to travel straight within a travel lane), while the second and third planned vehicle motion actions 222, 224 may cause the vehicle 104 to adjust its heading and/or speed (e.g., a movement within a travel lane, a stop, etc.). Accordingly, the vehicle computing system 102 may identify the first planned vehicle action 220 as not relevant and/or may identify the vehicle motion actions 222, 224 (e.g., that would adjust the heading and/or speed of the vehicle 104) as relevant.

Additionally or alternatively, the relevance of an object and/or a planned vehicle motion action can be based at least in part on the specific intended audience of the audible vehicle indication 150. For instance, some objects and/or planned vehicle motion actions may be considered relevant to a vehicle operator 108, 109 but not to a passenger 136 (e.g., a customer of a transportation service). The vehicle computing system 102 can identify an intended audience of the audible vehicle indication 150. In some implementations, to do so, the vehicle computing system 102 can process data from one or more sensors within the interior of the vehicle 104 to determine the presence of a vehicle operator 108 and/or a passenger 136 (within the vehicle 104). By way of example, the vehicle 104 can include a seat weight sensor, a temperature sensor, humidity sensor, a noise sensor, motion sensor, cameras, and/or other types of sensors within the interior of the vehicle 104. The vehicle computing system 102 can obtain data via these sensor(s) and determine whether an operator 108 and/or a passenger 136 is present in the vehicle 104. In some implementations, the vehicle computing system 102 can determine that an operator 108 is present in the vehicle 104 based on other data associated with the operator 108. For example, an operator 108 may login and/or provide other credential information to the vehicle computing system 102. In some implementations, the vehicle computing system 102 can determine that a passenger 136 is present in the vehicle 104 based on other data associated with the passenger 136. For example, the vehicle 104 can be assigned to a service request associated with the passenger 136 (e.g., a request for a transportation service). The vehicle computing system 102 can determine that the passenger 136 has entered into the vehicle 104 (e.g., to receive the requested service) based at least in part on data associated with the service request (e.g., a confirmation by the passenger 136 via a user device confirming that the passenger 136 has boarded the vehicle), a location of a user device associated with the passenger 136 (e.g., the user device being located in the vehicle 104), data provided by the operations computing system 106 (e.g., indicating that the passenger 136 has boarded the vehicle 104), and/or other information.

Additionally, or alternatively, the vehicle computing system 102 can identify that the intended audience of the audible vehicle indication 150 is a remote operator 109. In some implementations, the vehicle computing system 102 can identify that a remote operator 109 is monitoring the vehicle 104 based at least in part on data provided to and/or from the vehicle 104. For example, the vehicle computing system 102 can identify the intended audience as a remote operator 109 based at least in part on a request for assistance provided by the vehicle computing system 102 to the operations computing system 106. Additionally, or alternatively, the vehicle computing system 102 can identify that a remote operator 109 is connected to the vehicle 104 (e.g., over a network) based at least in part on data (e.g., received by the vehicle 104) indicating that the remote operator 109 is monitoring the vehicle 104 (or requests to monitor and/or control the vehicle 104). Such data can include data associated with the communications system 111 (e.g., data indicative of a wireless communication session).

In some implementations, the vehicle computing system 102 can identify the intended audience of the audible vehicle indication 150 based on the operating mode of the vehicle 104. For example, in the event that the vehicle 104 is adjusted between a fully autonomous mode and a semi-autonomous and/or manual operating mode, the vehicle computing system 102 can determine that a human operator 108, 109 is present in the vehicle 104 and/or at a remote location from the vehicle 104.

The vehicle computing system 102 can identify at least one of an object or a planned vehicle motion action as relevant based at least in part on the intended audience of the audible vehicle indication 150. For instance, several of the objects within the surrounding environment (e.g., within a threshold distance) may be relevant to an operator 108, 109 that desires to evaluate whether the perception system 124 is accurately perceiving objects around the vehicle 104 (e.g., without reviewing visual indicators, system data, etc.). By way of example, the operator 108, 109 may consider the fifth object 210 (e.g., the vehicle in another travel way) and the plurality of first objects 202 (e.g., the crowd of standing pedestrians) as relevant, to confirm the perception operations of the autonomy computing system 114. However, the vehicle computing system 102 may not consider such objects relevant to a passenger 136 that is using the vehicle 104 for a transportation service. Rather, the vehicle computing system 102 may identify only certain objects (e.g., 204, 206) that are nearest to the vehicle 104 and/or that would affect the motion of the vehicle 104 as relevant to a passenger 136. In this way, the vehicle computing system 102 can identify relevant objects for the passenger 136 to gain an assurance of the vehicle's autonomous operations, without overburdening/annoying the passenger 136.

In another example, the vehicle computing system 102 can identify all the planned vehicle motion actions 220-224 as relevant for an operator 108, 109 (e.g., who desires to evaluate the motion planning operations of the autonomy computing system 114). However, the vehicle computing system 102 may identify only certain planned vehicle motion actions as relevant to a passenger 136. This can include, for example, the planned vehicle motion actions 222, 224, that would affect the heading and/or speed of the vehicle 104. Accordingly, the vehicle computing system 102 can filter which objects and/or planned vehicle motions actions to communicate based at least in part on the intended audience. This can enable the vehicle computing system 102 to ensure that only the objects and/or planned vehicle motion actions considered relevant to the intended audience are communicated to that party.

In some implementations, an operator 108, 109 and/or passenger 136 may specify which objects and/or planned vehicle motion actions are to be communicated to the operator 108, 109 and/or the passenger 136. For example, the operator 108, 109 and/or the passenger 136 can provide user input to a graphical user interface to indicate a sensitivity level associated with the audible vehicle indication 150. The graphical user interface can be presented via a display device located onboard the vehicle 104 via one or more of the human-machine interfaces 140 (shown in FIG. 1). The human machine interface(s) 140 can include, for example, one or more user devices (e.g., tablet, laptop, etc.) with one or more display devices. The human-machine interface(s) 140 can be located within the interior of the vehicle 104. In some implementations, such a graphical user interface can be located off-board, remotely from the vehicle 104. The operator 108, 109 and/or the passenger 136 can specify (e.g., via the user input to the user interface) the types, locations (e.g., distance threshold), and/or other parameters of objects and/or planned vehicle actions for which the operator 108, 109 and/or the passenger 136 desires to receive an audible vehicle indication 150. By way of example, a passenger 136 can specify that the passenger 136 only desires to receive audible vehicle indications associated with objects that are within 10 yards of the vehicle 104. In another example, the passenger 136 can specify that the passenger 136 only desires to receive audible vehicle indications associated with planned vehicle motion actions that affect the heading and/or speed of the vehicle 104. In another example, the passenger 136 can specify that the passenger 136 does not desire to receive audible vehicle indications at all. The preferences of the operator 108, 109 and/or passenger 136 can be stored in a profile associated with that individual. The profile can be updated in the event that the preferences are adjusted.

The vehicle computing system 102 (e.g., the audible indication generator system 138) can determine an audible vehicle indication 150 associated with an identified object and/or a planned vehicle motion action. The audible vehicle indication 150 can be an audible sound with a plurality of audible characteristics designed to communicate a variety of information. The type of information layered within the audible vehicle indication 150 can vary depending on the system action of the autonomy computing system 114 (or collision mitigation system 135) to be communicated. For example, when communicating information associated with object perception and/or object motion prediction (e.g., by the perception system 124, the prediction system 126), the vehicle computing system 102 (e.g., the audible indication generator system 138) can generate an auditory vehicle indication 150 that indicates a type of the object, a distance of the object relative to the vehicle 104, the current location of the object relative to the vehicle 104, and/or one or more predicted future locations of the object (e.g., relative to the vehicle 104). When communicating information associated with the motion planning of the vehicle 104 (e.g., by the motion planning system 128, collision mitigation system 135), the vehicle computing system 102 can generate an auditory vehicle indication 150 that indicates, for example, a type of a planned vehicle motion action and/or one or more locations associated with the planned vehicle motion action (e.g., the direction of the action, where the action is to occur, etc.).

Figure 3:
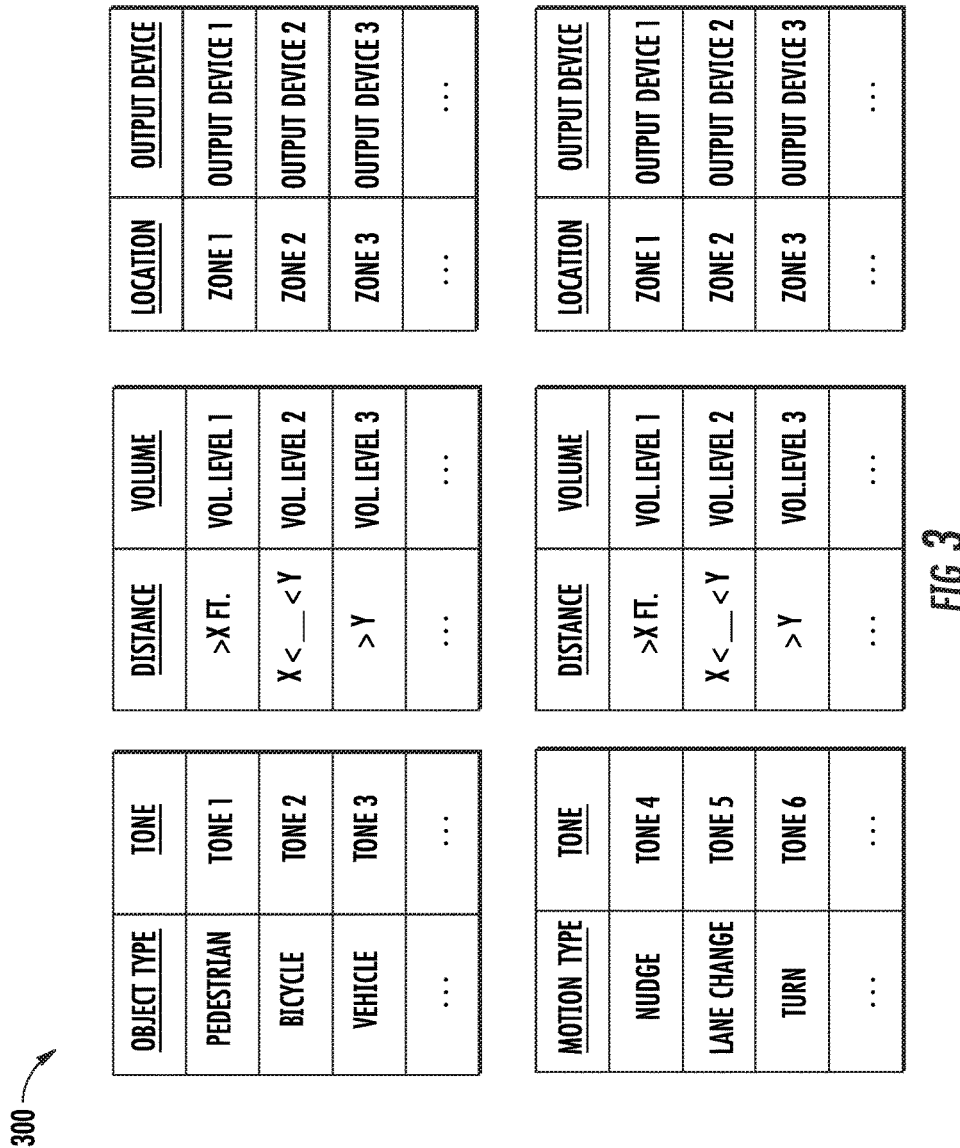
FIG. 3 depicts an example data structure according to example embodiments of the present disclosure.

In some implementations, to help formulate the audible vehicle indication 150, the vehicle computing system 102 (e.g., the audible indication generator system 138) can access a data structure stored, for example, in a memory onboard the vehicle 104 and/or at a remote location (e.g., the operations computing system 106). FIG. 3 depicts an example data structure 300 according to example embodiments of the present disclosure. The data structure 300 shown in FIG. 3 and the information included therein is provided as an example for explanatory purposes and is not intended to be limiting. The data structure can formatted in various manners and can include a variety of information in addition to, or in the alternative to, what is depicted in FIG. 3.

The data structure 300 can include one or more rule(s), table(s), list(s), tree(s), and/or other type(s) of data structure. The data structure 300 can be indicative of a plurality of auditory characteristics. The auditory characteristics can include, for example, tone, volume, frequency, and/or other sound characteristics. For instance, the data structure 300 can indicate which auditory characteristics are to be used for communicating certain types of information associated with an object and/or a planned vehicle motion action. The vehicle computing system 102 can identify one or more auditory characteristics of the plurality of auditory characteristics for the audible vehicle indication 150 based at least in part on the data structure 300.

By way of example, different sounds can be used to indicate different types of objects. In some implementations, a first tone (e.g., a beep at a first octave) can be used to indicate a pedestrian; a second tone (e.g., a beep at a second octave) can be used to indicate a bicycle; a third tone (e.g., a beep at a third octave) can be used to indicate a vehicle, etc. Additionally, or alternatively, different sounds can be used to indicate different types of vehicle motion actions. For example, a fourth tone (e.g., a beep at a fourth octave) can be used to indicate a nudge action within the vehicle's travel lane; a fifth tone (e.g., double-beep at the fourth octave) can be used to indicate a lane change; a sixth tone (e.g., triple-beep at the fourth octave) can be used to indicate a turn, etc. In some implementations, a seventh tone can be used to indicate that the vehicle 104 is planning on staying straight on its current trajectory. The vehicle computing system 102 can access the data structure 300 to determine how to communicate the type of object and/or planned vehicle motion action.

Additionally, or alternatively, the data structure 300 can indicate which auditory characteristics (e.g., volume levels) are to be used to indicate the distance of an object (e.g., relative to the vehicle 104) and/or the distance until a planned vehicle motion action is to be performed by the vehicle 104. For instance, different volume levels can be used to indicate different distance ranges. By way of example, the volume level of the audible vehicle indication 150 (e.g., the sound associated therewith) can correlate to the relative distance between the object and the vehicle 104 (e.g., the higher the decibel level/louder the volume, the closer the object is to the vehicle 104). For planned vehicle motion actions, the volume level of the audible vehicle indication 150 can correlate to the relative distance until the vehicle 104 is to perform the planned vehicle motion action (e.g., the higher the decibel level/louder the volume, the closer the vehicle 104 is to performing the planned vehicle motion action). In some implementations, the data structure 300 can indicate a volume level based at least in part on a distance range. For example, the data structure 300 can indicate that the audible vehicle indication 150 should be outputted at a first volume level in the event that the identified object is within a first distance range from the vehicle 104 (e.g., less than X ft.), a second volume level (e.g., a lower decibel level than the first volume level) can be used to indicate that an object is within a second distance range from the vehicle 104 (e.g., between X and Y ft.), a third volume level (e.g., a lower decibel level than the second volume level) can be used to indicate that an object is within a third distance range from the vehicle 104 (e.g., greater than Y ft.) and so forth, etc. As shown in FIG. 3, the data structure 300 can include a similar such approach for a planned vehicle motion actions. In some implementations, the data structure 300 can include a rule and/or function indicating the relationship between the volume and the distance (e.g., of the object, vehicle motion action). The vehicle computing system 102 can access the data structure 300 to determine how to communicate the distance associated with the object and/or the planned vehicle motion action (e.g., relative to the vehicle 104) to an intended audience.

Figure 4:
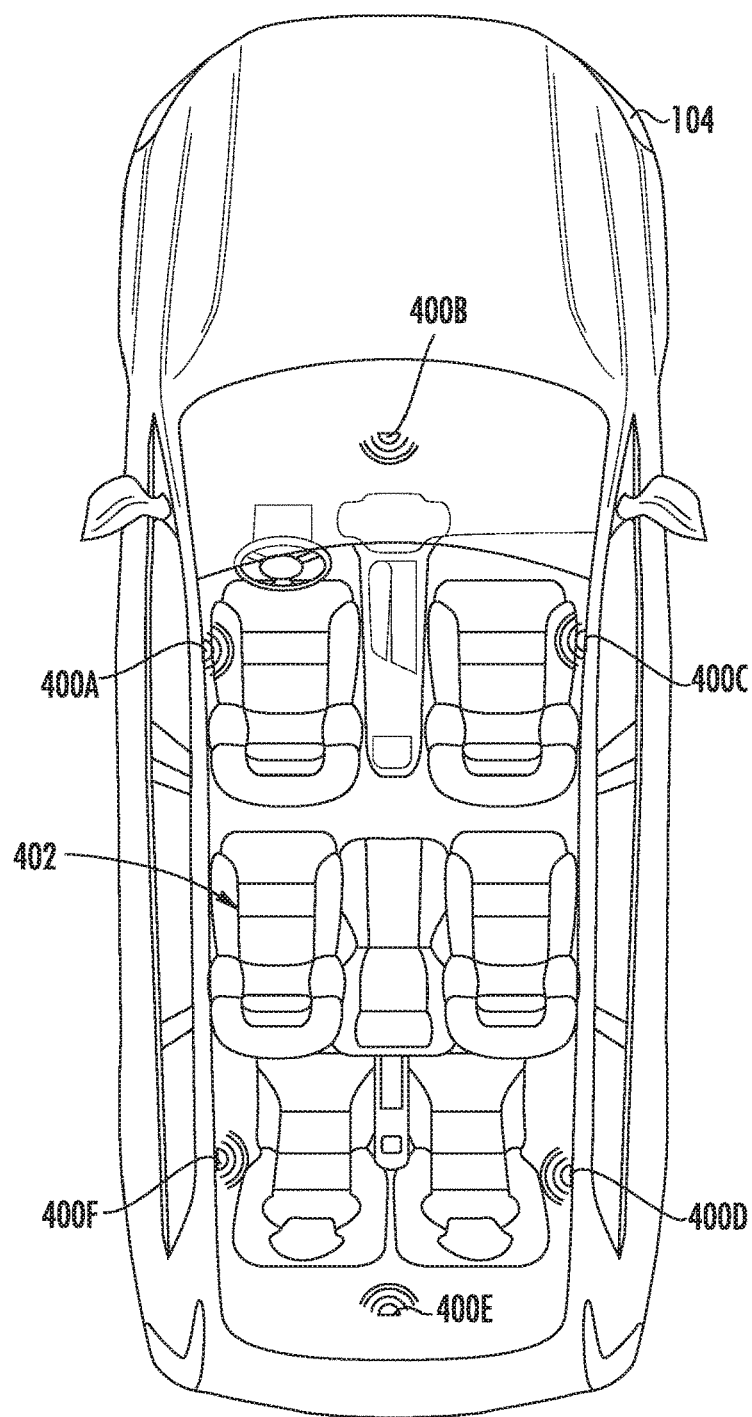
FIG. 4 depicts an example autonomous vehicle with output devices according to example embodiments of the present disclosure.

The data structure 300 can indicate how the auditory vehicle indication 150 is to indicate the location(s) of an object relative to the vehicle 104 and/or the location(s) associated with a planned vehicle motion action. For instance, as shown in FIG. 4, the vehicle 104 can include a plurality of output devices 400A-F. The output devices 400A-F can include audible output devices, such as, for example, speakers and/or other audible output device. The output devices 400A-F can be located within the interior 402 of the vehicle 104. The output devices can be positioned throughout the interior 402 of the vehicle 104. For example, a first output device 400A can be positioned on the front-left side of the vehicle 104 (e.g., at the driver's side door), a second output device 400B can be positioned in the center of the front of the vehicle 104 (e.g., at the center of the dash board), a third output device 400C can be positioned on the front-right side of the vehicle 104 (e.g., at the front passenger's side door), a fourth output device 400D can be positioned at the back-right side of the vehicle 104 (e.g., at the rear right-side passenger door), a fifth output device 400E can be positioned at the rear of the vehicle 104 (e.g., near the center of the vehicle trunk), a sixth output device 400F can be positioned at the back-left side of the vehicle 104 (e.g., at the rear left-side passenger door), etc.

Returning to FIG. 3, the data structure 300 can indicate how the vehicle computing system 102 can leverage these various output devices 400A-F to communicate the location(s) associated with an object and/or a planned vehicle motion action. For instance, the vehicle computing system 102 can determine one or more locations associated with the identified object (e.g., relevant object) and/or a planned vehicle motion action (e.g., relevant vehicle motion action). The vehicle computing system 102 can determine which of the output devices 400A-F to utilize to indicate these location(s). By way of example, the vehicle computing system 102 can determine that the current location of the third object 206 is located to the front-right side of the vehicle 104 (e.g., "Zone 3"). The data structure 300 can indicate that for this location, the audible vehicle indication 150 can be outputted via the third output device 400C positioned on the front-right side of the vehicle 104 (e.g., at the front passenger's side door) in order to indicate this location of the third object 206 relative to the vehicle 104.

Additionally, or alternatively, the vehicle computing system 102 can determine which of the output devices 400A-F to utilize to indicate the predicted future location(s) of an object (e.g., a relevant object). For example, the vehicle computing system 102 can determine that the second object 204 is predicted to travel to one or more predicted future locations 212 that form a right-to-left path in front of the vehicle 104 (e.g., a pedestrian travelling right-to-left along a crosswalk), as shown in FIG. 2. The data structure 300 can indicate that for these location(s) (e.g., Zones 3-2-1), the audible vehicle indication 150 can be outputted in a sequence starting with the third output device 400C positioned on the front-right side of the vehicle 104 (e.g., at the front passenger's side door), then via the second output device 400B positioned in the center of the front of the vehicle 104 (e.g., at the center of the dash board), and then via the first output device 400A positioned on the front-left side of the vehicle 104 (e.g., at the driver's side door). This can reflect the predicted trajectory of the second object 204.

In another example, the vehicle computing system 102 can determine that the fourth object 208 is predicted to travel to one or more predicted future locations 214 starting from the left of the vehicle 104, along a path from an adjacent travel lane to the current travel lane of the vehicle 104, as shown in FIG. 2. The data structure 300 can indicate that for these location(s) (e.g., Zones 1-2), the audible vehicle indication 150 can be outputted in a sequence starting with the first output device 400A positioned on the front-left side of the vehicle 104, then via the second output device 400B positioned in the center of the front of the vehicle 104. This can reflect the predicted trajectory of the fourth object 208.

In another example, the vehicle computing system 102 can determine that the fifth object 210 is predicted to travel to one or more predicted future locations 216 along the left side of the vehicle 104, as shown in FIG. 2. The data structure 300 can indicate that for these location(s), the audible vehicle indication 150 can be outputted in a sequence starting with the first output device 400A positioned on the front-left side of the vehicle 104, then via the sixth output device 400F positioned at the back-left side of the vehicle 104. This can reflect the predicted trajectory of the fifth object 210.

The vehicle computing system 102 can also determine which of the output devices 400A-F to utilize to indicate the location(s) of a planned vehicle motion action. For example, the vehicle computing system 102 can determine that the vehicle 104 is to perform the first planned vehicle motion action 220 (e.g., maintain a straight trajectory within the vehicle's travel lane). The data structure 300 can indicate that for the location associated with the first planned vehicle motion action 220, the audible vehicle indication 150 can be outputted via the second output device 400B positioned in the center of the front of the vehicle 104. This can reflect the location of the first planned vehicle motion action 220 (e.g., a trajectory associated therewith).

In another example, the vehicle computing system 102 can determine that the vehicle 104 is to perform the second planned vehicle motion action 222 (e.g., a nudge to the left within the vehicle's travel lane). The data structure 300 can indicate that for the location associated with this planned vehicle motion action, the audible vehicle indication 150 can be outputted via the first output device 400A positioned on the front-left side of the vehicle 104 (e.g., at the driver's side door) and/or the sixth output device 400F positioned at the back-left side of the vehicle 104 (e.g., at the rear left-side passenger door). This can reflect the location of the second planned vehicle motion action 222.

In some implementations, the output devices 400A-F can be positioned at a variety of heights within the vehicle 104. The data structure 300 can indicate which output device(s) should be utilized to identify the heights of certain objects. The vehicle computing system 102 can output the audible vehicle indication 150 via the output device(s) at certain heights within the vehicle 104 to indicate the height of an object.

In some implementations, the audible vehicle indication 150 can be indicative of an intention of an object within the surrounding environment 200 of the vehicle 104. For example, the vehicle computing system 102 can determine an intention of an object with respect to the vehicle 104 based at least in part on the object's motion relative to the vehicle 104 (e.g., the object's location, velocity, acceleration, and/or other characteristics). The intention of the object can, for example, be indicative of whether the object is unfriendly (e.g., acting/will be acting harmful or potentially harmful) or friendly (e.g., not acting/will not be acting harmful or potentially harmful) to the vehicle 104. In some implementations, the data structure 300 can indicate one or more auditory characteristics to be used to properly convey the intention of the object. For instance, the frequency (e.g., number of outputs per timeframe) with which the audible vehicle indication 150 is outputted can indicate the intention of the object. By way of example, the data structure 300 can indicate that for an unfriendly object the audible vehicle indication 150 can be outputted repetitively, at higher frequency (e.g., X times per Y second(s)) than for a friendly object (e.g., which maybe outputted only once).

In some implementations, at least one of the identified auditory characteristics of the audible vehicle indication 150 can be based at least in part on an intended audience of the audible vehicle indication 150. For instance, the vehicle computing system 102 may communicate the type of an object differently to an operator 108, 109 (e.g., that may be trained to recognize certain tones) than a passenger 136 (e.g., a customer of a transportation service that is not familiar with specialized tones). By way of example, the data structure 300 can specify that for a vehicle operator 108, 109, the audible vehicle indication 150 is to include a tone (e.g., a beep) to indicate the type of object to the operator 108, 109. Additionally, or alternatively, the data structure 300 can indicate that for a passenger 136, the audible vehicle indication 150 is to include a voice message (e.g., a one-word message stating "pedestrian," "bicycle," "vehicle," etc.) to indicate the type of object to the passenger 136 (e.g., who is not specifically trained to identify certain tones). In this way, the vehicle computing system 102 can adapt the audible vehicle indication 150 to the level of experience that an individual may have with the vehicle 104.

The vehicle computing system 102 can output the audible vehicle indication 150 via one or more output device(s). For instance, the vehicle computing system 102 can output, within the interior 402 of the vehicle 104, via one or more output devices 400A-F, the audible vehicle indication 150 that is associated with an identified object or a planned vehicle motion action (e.g., a relevant object, a relevant planned vehicle motion action). In some implementations, the vehicle computing system 102 can provide data indicative of the auditory vehicle indication 150 to one or more remote computing devices (e.g., of the operations computing system 106). In this way, the audible vehicle indication 150 can be outputted to a remote operator 109 of the vehicle 104 via a remote output device 142 (shown in FIG. 1), that is remote from the vehicle 104.

The vehicle computing system 102 can output the audible vehicle indication 150 as a layered combination of the auditory characteristics (e.g., designated by the data structure 300) to communicate various types of information. For instance, the audible vehicle indication 150 can be indicative of a type of the object or a type of the planned vehicle motion action. Moreover, the audible vehicle indication 150 can be outputted in a manner that is indicative of one or more location(s) associated with an object or a planned vehicle motion action (e.g., a current location, future location(s)). For example, the vehicle computing system 102 can output the audible vehicle indication 150 via one or more output device(s) 400A-F. The one or more output devices 400A-F can correspond to one or more locations associated with the object or one or more locations associated with the planned vehicle motion action, as described herein. For instance, for an object perceived within the surrounding environment 200 of the vehicle 104, the vehicle computing system 102 can output an audible vehicle indication 150 that includes a tone (e.g., indicating the type of object), at a certain volume (e.g., to indicate the relative distance from the object to the vehicle 104), via one or more selected output devices at certain positions within the vehicle 104 (e.g., to indicate the location of the object and/or its predicted motion). By way of example, for the second object 204 (e.g., the moving pedestrian) the vehicle computing system 102 can output an audible vehicle indication 150 that includes a first tone (e.g., a beep at a first octave) to indicate a pedestrian, at a volume level that indicates the distance of the second object 204. Moreover, the audible vehicle indication 150 associated with the second object 204 can be outputted via the third, second, and first output devices 400A-C, as described herein, to indicative the location(s) (e.g., current, future locations) of the second object 204. In some implementations, the audible vehicle indication 150 can be outputted at a lower frequency (e.g., once) to indicate that the second object 204 is friendly to the vehicle 104. An operator 108, 109 and/or a passenger 136 can evaluate and recognize the operation of the vehicle's autonomy computing system 114 (e.g., perception system 124, prediction system 126) based on the outputted audible vehicle indication 150.

Additionally, or alternatively, for a planned vehicle motion action, the vehicle computing system 102 can output an audible vehicle indication 150 that includes a tone (e.g., to indicate the type of vehicle maneuver), at a certain volume (e.g., to indicate the relative distance until the vehicle maneuver), via one or more selected output devices at certain positions within the vehicle 104 (e.g., to indicate the location(s) associated with the vehicle maneuver). By way of example, for the second planned vehicle motion action 222 (e.g., the moving pedestrian) the vehicle computing system 102 can output an audible vehicle indication 150 that includes a fourth tone (e.g., a beep at a fourth octave) to indicate a nudge action, at a volume level that indicates the distance until the vehicle 104 is to perform the second planned vehicle motion action 222 (e.g., the nudge action). Moreover, the audible vehicle indication 150 associated can be outputted via the first and/or sixth output devices 400A, 400F, as described herein, to indicative the location(s) of the second planned vehicle motion action 222.

In some implementations, the vehicle computing system 102 can output the audible vehicle indication 150 based at least in part on a level of attentiveness of an operator 108 within the vehicle 104. The vehicle 104 can include one or more operator sensors 144 (shown in FIG. 1) within the interior of the vehicle. The vehicle computing system can be configured to determine whether the operator 108 (e.g., positioned in a driver's seat) is paying attention to the travel way and/or vehicle actions. For example, the operator sensor(s) 144 (e.g., motion sensors, pressure sensors, cameras, etc.) can be configured to acquire data associated with an operator 108. Such data can include, for example, data indicative of whether the operator 108 has removed his/her hands from a steering mechanism (e.g., steering wheel), data indicative of whether the operator's eyes have deviated from the vehicle's travel way, and/or whether the operator's body language is indicative of potential inattentiveness (e.g., head bobbing due to fatigue). The vehicle computing system 102 can obtain data associated with the operator 108 via the operator sensor(s) 144. The vehicle computing system 102 can determine a level of attentiveness associated with the operator 108 located within the interior of the vehicle 104 based at least in part on such data. The vehicle computing system 102 can output an audible vehicle indication 150 based at least in part on the level of attentiveness. For example, in the event that the operator's eyes have deviated from the travel way, the vehicle computing system 102 can output an audible vehicle indication 150 (e.g., that is indicative of a state of a perceived object) within the interior 402 of the vehicle 104, to help regain the operator's attention. In some implementations, the vehicle computing system 102 can output background noise (e.g., continuously, with the audible vehicle indication, etc.) to help maintain operator attentiveness.

Figure 5:
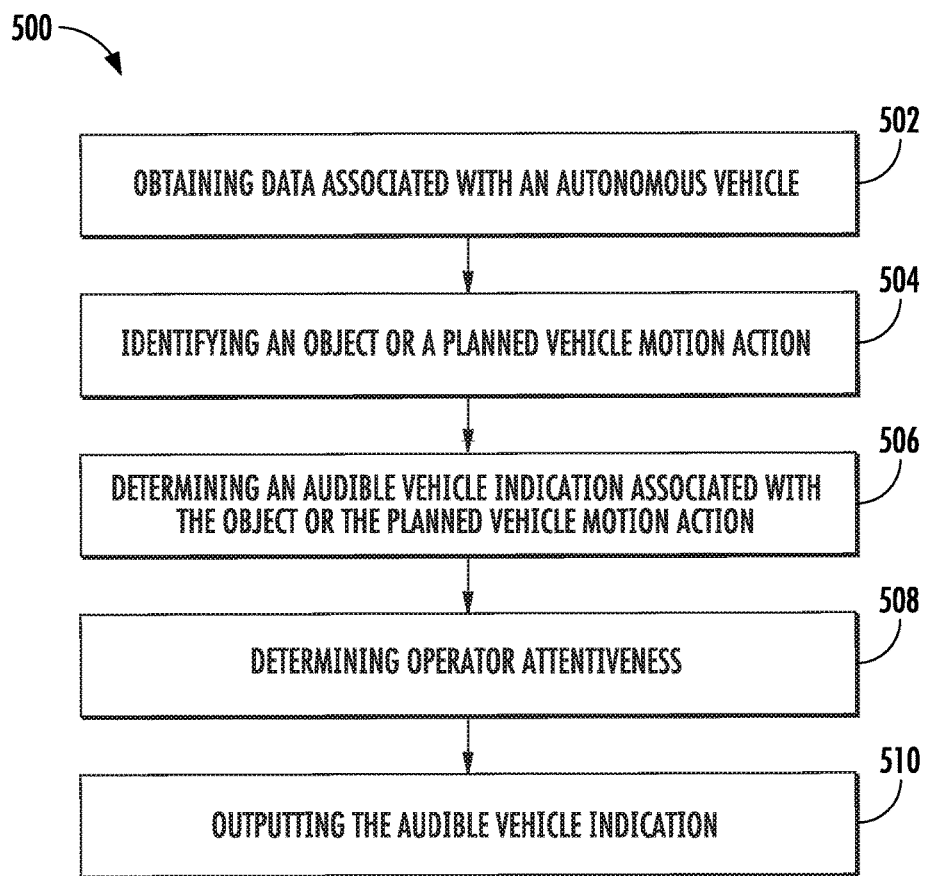
FIG. 5 depicts a flow diagram of an example method of communicating autonomous vehicle operations according to example embodiments of the present disclosure.

FIG. 5 depicts a flow diagram of an example method 500 of communicating autonomous vehicle operations according to example embodiments of the present disclosure. One or more portion(s) of the method 500 can be implemented by one or more computing devices such as, for example, the one or more computing device(s) of the vehicle computing system 102 (e.g., onboard the vehicle 104). Each respective portion of the method 500 can be performed by any (or any combination) of the one or more computing devices. Moreover, one or more portion(s) of the method 500 can be implemented as an algorithm on the hardware components of the device(s) described herein (e.g., as in FIGS. 1 and 6), for example, to communicate autonomous vehicle operations. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include obtaining data associated with a vehicle. For instance, the vehicle computing system 102 can obtain data associated with the vehicle 104 (e.g., an autonomous vehicle). The data associated with the vehicle 104 can include at least one of perception data 130 obtained by an autonomy system 114 (e.g., the perception system 124) of the vehicle 104, prediction data 132 obtained by the autonomy system 114 (e.g., the prediction system 126) of the vehicle 104, data associated with a motion plan 134 of the vehicle 104, or data associated with a collision mitigation system 135 of the vehicle 104.

At (504), the method 500 can include identifying an object or a planned vehicle motion action. The vehicle computing system 102 can identify an object 202-210 within the surrounding environment 200 of the vehicle 104 or a planned vehicle motion action 220-224 of the vehicle 104 based at least in part on the data associated with the vehicle 104. In some implementations, the vehicle computing system 102 can identify object(s) and/or planned vehicle motion action(s) that may be relevant to an intended audience of an associated audible vehicle indication 150. For example, the vehicle computing system 102 can identify a current location of an object based at least in part on the data associated with the vehicle 104. The identified object can be included in the plurality of objects 202-210 within the surrounding environment 200 of the vehicle 104. The vehicle computing system 102 can determine that the object is relevant to an intended audience of the audible vehicle indication 150 based at least in part on the current location of the object, as described herein. Additionally, or alternatively, the vehicle computing system 102 can identify one or more predicted future locations of an object. As described herein, the vehicle computing system 102 can determine that the object is relevant to an intended audience of the audible vehicle indication 150 based at least in part on the one or more predicted future locations of the object. Additionally, or alternatively, the vehicle computing system 102 can identify a plurality of planned vehicle motion actions 220-224 of a motion plan 134 of the vehicle 104 based at least in part on the data associated with the vehicle 104. The vehicle computing system 102 can determine that a planned vehicle motion action (e.g., included in the plurality of planned vehicle motion actions 220-224) is relevant to an intended audience of the audible vehicle indication 150. For example, the vehicle computing system 102 can determine that a planned vehicle motion action is relevant to the intended audience of the audible vehicle indication 150 based at least in part on at least one of a type of the planned vehicle motion action or an effect of the planned vehicle motion action on at least one of a heading or a speed of the vehicle 104.

At (506), the method 500 can include determining an audible vehicle indication associated with the object or the planned vehicle motion action. The vehicle computing system 102 can determine an audible vehicle indication 150 that is associated with the identified object or the planned vehicle motion action. For example, the vehicle computing system 102 can access a data structure 300 stored in a memory located onboard the vehicle 104. The data structure 300 can be indicative of a plurality of auditory characteristics. The vehicle computing system 102 can identify one or more auditory characteristics of the plurality of auditory characteristics for the audible vehicle indication 150 based at least in part on the data structure 300. In some implementations, at least one of the identified auditory characteristics can be based at least in part on an intended audience of the audible vehicle indication 150. The audible vehicle indication 150 can be indicative of a type of the object or a type of the planned vehicle motion action. In some implementations, the audible vehicle indication 150 can be indicative of a distance of the object relative to the vehicle 104 (or a distance until the vehicle motion action). In some implementations, the audible vehicle indication can be indicative of an intention of an object within the surrounding environment 200 of the vehicle 104, as described herein.

In some implementations, at (508), the method 500 can include determining a level of attentiveness of an operator. For example, the vehicle computing system 102 can determine a level of attentiveness associated with an operator 108 located within the interior of the vehicle 104. The vehicle computing system 102 can output the audible vehicle indication 150 based at least in part on the level of attentiveness, as described herein.

At (510), the method 500 can include outputting the audible vehicle indication. For instance, the vehicle computing system 102 can output, via one or more output devices 400A-F onboard the vehicle 104, the audible vehicle indication 150. The audible vehicle indication 150 can be outputted within the interior 402 of the vehicle 104 in a manner that is indicative of one or more locations associated with an object or one or more locations associated with a planned vehicle motion action. The one or more locations associated with the object (or the planned vehicle motion action) can include at least one of a current location of the object (or the planned vehicle motion action) or one or more predicted future locations of the object (or the planned vehicle motion action). For example, as described herein, the vehicle 104 can include a plurality of output devices 400A-F. The vehicle computing system 102 can select at least a subset of the plurality of output devices 400A-F located onboard the vehicle 104 based at least in part on the one or more locations associated with the object or the one or more locations associated with the planned vehicle motion action. One or more positions of the subset of output devices 400A-F can correspond to the one or more locations associated with the object or the one or more locations associated with the planned vehicle motion action. The vehicle computing system 102 can output via the subset of the plurality of output devices 400A-F, the audible vehicle indication 150. The audible vehicle indication 150 can be outputted in a manner that is indicative of the one or more future locations (and/or a current location). Moreover, the vehicle computing system 102 can output the auditory vehicle indication 150 in accordance with the one or more identified auditory characteristics, as described herein.

FIG. 6 depicts an example system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include the vehicle computing system 102 of the vehicle 104 and a remote computing system 620 (e.g., the operations computing system 106) that can be communicatively coupled to one another over one or more networks 610. The remote computing system 620 can be associated with a central operations system and/or an entity associated with the vehicle 104 such as, for example, a vehicle owner, vehicle manager, fleet operator, service provider, etc.

The computing device(s) 601 of the vehicle computing system 102 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, data registrar, etc., and combinations thereof.

The memory 604 can store information that can be accessed by the one or more processors 602. For instance, the memory 604 (e.g., one or more non-transitory computer-readable storage mediums, memory devices) on-board the vehicle 104 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 104 can store instructions 606 that when executed by the one or more processors 602 on-board the vehicle 104, cause the one or more processors 602 (the vehicle computing system 102) to perform operations such as any of the operations and functions of the vehicle computing system 102, the operations and functions for performing system actions (e.g., perceiving objects within the vehicle's surrounding environment, predicting object motion, planning vehicle motion, etc.), the operations and functions for communicating autonomous vehicle operations (e.g., one or more portions of method 500), and/or any other operations and functions of the vehicle computing system 102 as described herein.

The memory 604 can store data 608 that can be obtained, received, accessed, written, manipulated, created, and/or stored. The data 608 can include, for instance, data associated with a vehicle (e.g., perception data, prediction data, motion planning data, data associated with a collision mitigation system, etc.), a data structure that can be used to determine an audible vehicle indication, data associated with an audible vehicle indication, data associated with one or more output devices (e.g., the positions of the output device(s)) and/or other data/information as described herein. In some implementations, the computing device(s) 601 can obtain data from one or more memories that are remote from the vehicle 104.

The computing device(s) 601 can also include a communication interface 609 used to communicate with one or more other system(s) on-board the vehicle 104 and/or a remote computing device that is remote from the vehicle 104 (e.g., of the operations computing system 106). The communication interface 609 can include any circuits, components, software, etc. for communicating via one or more networks (e.g., 610). In some implementations, the communication interface 609 can include, for example, one or more of a communications controller, receiver, transceiver, transmitter, port, conductors, software and/or hardware for communicating data.

The network(s) 610 can be any type of network or combination of networks that allows for communication between devices. In some embodiments, the network(s) 610 can include one or more of a local area network, wide area network, the Internet, secure network, cellular network, mesh network, peer-to-peer communication link and/or some combination thereof and can include any number of wired or wireless links. Communication over the network(s) 610 can be accomplished, for instance, via a communication interface using any type of protocol, protection scheme, encoding, format, packaging, etc.

The remote computing system 620 can include one or more remote computing devices that are remote from the vehicle computing system 102. The remote computing devices can include components (e.g., processor(s), memory, instructions, data) similar to that described herein for the computing device(s) 601. Moreover, the remote computing system 620 can be configured to perform one or more operations of the operations computing system 106, as described herein.

Computing tasks discussed herein as being performed at computing device(s) remote from the vehicle can instead be performed at the vehicle (e.g., via the vehicle computing system), or vice versa. Moreover, computing tasks discussed herein as being performed by the operations computing system can be performed by another computing system. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for communicating autonomous vehicle operations, comprising:
    obtaining, by a computing system comprising one or more computing devices onboard an autonomous vehicle, data associated with the autonomous vehicle;
    identifying, by the computing system, one or more objects within a surrounding environment of the autonomous vehicle or one or more planned vehicle motion actions of the autonomous vehicle based at least in part on the data associated with the autonomous vehicle;
    identifying a relevant object of the one or more objects or a relevant planned vehicle motion action of the one or more planned vehicle motions based at least in part on a type of an intended audience of an audible vehicle indication associated with the relevant object or the relevant planned vehicle motion action, wherein the type of the intended audience includes an operator of the autonomous vehicle or a passenger of the autonomous vehicle;
    generating, by the computing system, the audible vehicle indication that is associated with the relevant object or the relevant planned vehicle motion action; and
    outputting, by the computing system via one or more output devices onboard the autonomous vehicle, the audible vehicle indication, wherein the audible vehicle indication is outputted within an interior of the autonomous vehicle in a manner that is indicative of one or more locations associated with the relevant object or one or more locations associated with the relevant planned vehicle motion action.

2. The computer-implemented method of claim 1, wherein identifying, by the computing system, the relevant object or the relevant planned vehicle motion action comprises:
    identifying, by the computing system, a current location of the relevant object based at least in part on the data associated with the autonomous vehicle; and
    determining, by the computing system, that the relevant object is relevant to the intended audience of the audible vehicle indication based at least in part on the current location of the relevant object.

3. The computer-implemented method of claim 2, wherein the audible vehicle indication is indicative of a distance of the relevant object relative to the autonomous vehicle.

4. The computer-implemented method of claim 1, wherein identifying, by the computing system, the relevant object comprises:
 identifying, by the computing system, one or more predicted future locations of the relevant object; and
 determining, by the computing system, that the relevant object is relevant to the intended audience of the audible vehicle indication based at least in part on the one or more predicted future locations of the relevant object.

5. The computer-implemented method of claim 4, wherein the audible vehicle indication is outputted in a manner that is indicative of the one or more future locations.

6. The computer-implemented method of claim 1, wherein identifying, by the computing system, the relevant planned vehicle motion action comprises:
 identifying, by the computing system, a plurality of planned vehicle motion actions of a motion plan of the autonomous vehicle based at least in part on the data associated with the autonomous vehicle, wherein the relevant planned vehicle motion action is included in the plurality of planned vehicle motion actions; and
 determining, by the computing system, that the relevant planned vehicle motion action is relevant to the intended audience of the audible vehicle indication.

7. The computer-implemented method of claim 6, wherein determining, by the computing system, that the relevant planned vehicle motion action is relevant to the intended audience of the audible vehicle indication comprises determining, by the computing system, that the relevant planned vehicle motion action is relevant to the intended audience of the audible vehicle indication based at least in part on at least one of a type of the relevant planned vehicle motion action or an effect of the relevant planned vehicle motion action on at least one of a heading or a speed of the autonomous vehicle.

8. The computer-implemented method of claim 1, wherein the data associated with the autonomous vehicle comprises at least one of perception data obtained by an autonomy system of the autonomous vehicle, prediction data obtained by the autonomy system of the autonomous vehicle, data associated with a motion plan of the autonomous vehicle, or data associated with a collision mitigation system of the autonomous vehicle.

9. The computer-implemented method of claim 1, wherein the autonomous vehicle comprises a plurality of output devices onboard the autonomous vehicle, and wherein outputting the audible vehicle indication comprises:
 selecting, by the computing system, a subset of the plurality of output devices located onboard the autonomous vehicle based at least in part on the one or more locations associated with the relevant object or the one or more locations associated with the relevant planned vehicle motion action; and
 outputting, by the computing system via the subset of the plurality of output devices, the audible vehicle indication.

10. The computer-implemented method of claim 9, wherein one or more positions of the subset of output devices correspond to the one or more locations associated with the relevant object or the one or more locations associated with the relevant planned vehicle motion action.

11. The computer-implemented method of claim 10, wherein the one or more locations associated with the relevant object comprise at least one of a current location of the relevant object or one or more predicted future locations of the relevant object.

12. The computer-implemented method of claim 1, wherein determining, by the computing system, the audible vehicle indication comprises:
 accessing, by the computing system, a data structure stored in a memory located onboard the autonomous vehicle, wherein the data structure is indicative of a plurality of auditory characteristics;
 identifying, by the computing system, one or more auditory characteristics of the plurality of auditory characteristics for the audible vehicle indication based at least in part on the data structure, and
 wherein outputting, by the computing system via the one or more output devices onboard the autonomous vehicle, the audible vehicle indication comprises outputting the audible vehicle indication in accordance with the one or more identified auditory characteristics.

13. The computer-implemented method of claim 12, wherein at least one of the identified auditory characteristics is based at least in part on the intended audience of the audible vehicle indication.

14. A computing system for communicating autonomous vehicle operations, comprising:
 one or more processors; and
 one or more memory devices, the one or more memory devices storing instructions that when executed by the one or more processors cause the computing system to perform operations, the operations comprising:
 obtaining data associated with the autonomous vehicle;
 identifying an object within a surrounding environment of the autonomous vehicle or a planned vehicle motion action of the autonomous vehicle based at least in part on the data associated with the autonomous vehicle and a type of an intended audience of an audible vehicle indication associated with the object or the planned vehicle motion action, wherein the type of the intended audience includes an operator of the autonomous vehicle or a passenger of the autonomous vehicle; and
 outputting within an interior of the autonomous vehicle, via one or more output devices, the audible vehicle indication that is associated with the identified object or the planned vehicle motion action.

15. The computing system of claim 14, wherein identifying the object within the surrounding environment of the autonomous vehicle or the planned vehicle motion action of the autonomous vehicle comprises:
 identifying the type of intended audience of the audible vehicle indication; and
 identifying the object or the planned vehicle motion action as relevant based at least in part on the type of the intended audience of the audible vehicle indication.

16. The computing system of claim 14, wherein the one or more output devices correspond to one or more locations associated with the object or one or more locations associated with the planned vehicle motion action.

17. The computing system of claim 14, wherein the operations further comprise:
 providing data indicative of the audible vehicle indication to one or more remote computing devices, wherein the audible vehicle indication is outputted to a remote operator of the autonomous vehicle.

18. An autonomous vehicle, comprising:
 one or more output devices;
 one or more processors; and
 one or more memory devices, the one or more memory devices storing instructions that when executed by the one or more processors cause the autonomous vehicle to perform operations, the operations comprising:

obtaining data associated with the autonomous vehicle;

identifying an object within a surrounding environment of the autonomous vehicle or a planned vehicle motion action of the autonomous vehicle based at least in part on the data associated with the autonomous vehicle and a type of an intended audience of an audible vehicle indication associated with the object or the planned vehicle motion action, wherein the type of the intended audience includes an operator of the autonomous vehicle or a passenger of the autonomous vehicle;

generating the audible vehicle indication that is associated with the identified object or the planned vehicle motion action; and outputting, via the one or more output devices, the audible vehicle indication, wherein the one or more output devices correspond to one or more locations associated with the object or one or more locations associated with the planned vehicle motion action.

19. The autonomous vehicle of claim 18, wherein the operations further comprise:

determining a level of attentiveness associated with the operator located within an interior of the autonomous vehicle, and wherein outputting, via the one or more output devices, the audible vehicle indication comprises outputting the audible vehicle indication based at least in part on the level of attentiveness.

20. The autonomous vehicle of claim 19, wherein the audible vehicle indication is indicative of an intention of the object within the surrounding environment of the autonomous vehicle.

* * * * *